United States Patent [19]

Chang

[11] Patent Number: 5,077,697
[45] Date of Patent: Dec. 31, 1991

[54] DISCRETE-FREQUENCY MULTIPOLE SONIC LOGGING METHODS AND APPARATUS

[75] Inventor: Shu-Kong Chang, West Redding, Conn.

[73] Assignee: Schlumberger Technology Corporation, New York, N.Y.

[21] Appl. No.: 513,319

[22] Filed: Apr. 20, 1990

[51] Int. Cl.$^5$ ............................................. G01V 1/40
[52] U.S. Cl. ...................................... 367/31; 367/48; 367/75; 364/422
[58] Field of Search .................... 367/26, 30, 31, 48, 367/75; 364/422, 924.5, 223.9

[56] References Cited

U.S. PATENT DOCUMENTS

| | | |
|---|---|---|
| 3,330,375 | 7/1967 | White . |
| 3,475,722 | 10/1969 | White . |
| 3,593,255 | 7/1971 | White . |
| 4,207,961 | 6/1980 | Kitsunezaki . |
| 4,383,591 | 5/1983 | Ogura . |
| 4,419,748 | 12/1983 | Siegfried, II . |
| 4,516,228 | 5/1985 | Zemanek . |
| 4,562,557 | 12/1985 | Parks et al. ............................ 367/31 |
| 4,594,662 | 6/1986 | Devaney .............................. 364/421 |
| 4,606,014 | 8/1986 | Winbow et al. . |
| 4,649,525 | 3/1987 | Angona et al. . |
| 4,649,526 | 3/1987 | Winbow et al. . |
| 4,682,308 | 7/1987 | Chung . |
| 4,698,792 | 10/1987 | Kurkjian et al. . |
| 4,700,803 | 10/1987 | Minear . |
| 4,703,460 | 10/1987 | Kurkjian et al. . |
| 4,709,362 | 11/1987 | Cole . |
| 4,932,003 | 6/1990 | Winbow et al. ....................... 367/75 |

FOREIGN PATENT DOCUMENTS

GB2158581A 11/1985 United Kingdom .

OTHER PUBLICATIONS

Ellefsen et al., "Estimating Phase Velocity ... Logging Data", 57th Annu. Soc. Explor. Geophys. Ent. Mtg., 10/15/87, pp. 665-667, abst. only included.
Schmett, D. P., "Shear Wave Logging in Electric Formations", J. Acoust. Soc. Amer., vol. 84, #6, pp. 2215-2229, 12/88, abst. only provided.
Ellefgen et al., "Estimating Phase Velocity ... Logging Data", Geophysics, vol. 54, #8, pp. 1054-1059, 8/89, abst. provided.
Winbow, G. A., "A Theoretical Study ... Soft Formations", Geophysics, vol. 53, #10, pp. 1324-1242, 10/88, abst. provided.
J. White, The HULA Log: A Proposed Acoustic Tool, presented at the Society of Professional Well Log Analysts Conference, 1967.
H. Leslie and F. Mons, Sonic Waveform Analysis: Applications, presented at the Society of Professional Well Log Analysts (SPWLA) Annual Logging Symposium, New Orleans, La., Jun. 10-13, 1984.

(List continued on next page.)

Primary Examiner—Nelson Moskowitz
Attorney, Agent, or Firm—Bruce D. Riter; Marc D. Foodman

[57] ABSTRACT

The present invention offers methods and apparatus for sonic borehole logging of formation shear using discrete frequency measurements. A multipole source transducer emits sonic energy at a location in a borehole of at least one discrete frequency which induces propagation of multipole sonic waves in the borehole; sonic energy of the multipole sonic waves is detected at multiple receiver locations in the borehole by multipole receivers to produce a received sonic signal for each location, the multiple receiver locations being spaced apart from one another and from the source transducer location. For each receiver location, the complex values of the received sonic signal are detected relative to a predetermined phase reference. The detected complex values of the received sonic signal may be processed to determine multipole sonic wave velocity and shear attenuation at discrete frequencies and to calculate velocity and attenuation as a function of frequency.

87 Claims, 8 Drawing Sheets

OTHER PUBLICATIONS

C. Kitsunezaki, A New Method for Shear-Wave Logging, 45 Geophysics 10, pp. 1489-1506 (Oct., 1980).

K. Tanaka, S. Inoue and K. Ogura, Development of a Suspension PS Logging System's Seismic Source for Hard Ground, presented at the 56th SEG Annual Meeting, Houston, Tex., Nov. 2-6, 1986.

J. Zemanek, F. Angona, D. Williams and R. Caldwell, Continuouos Acoustic Shear Wave Logging, presented at the 25th SPWLA Logging Symposium, New Orleans, 1984.

W. Benzing, Experimentation in Downhole Shear Wave Velocity Measurements, presented at the SEG Annual Meeting, Las Vegas, Nev., Sep. 11-15, 1983.

G. Nunn and W. Currie, Bender Technology Applied to Borehole Sources, presentation at the Interwell Seismic Surveying Workshop, Los Alamos, N.M. Mar. 24-26, 1988.

S. Cohick and J. Butler, *Rare-earth Iron Square Ring Dipole Transducer*, 72, Journal of the Acoustical Society of America 2, Aug., 1982.

A. Jurkjian and S. Chang, *Acoustic Multipole Sources in Fluid-Filled Boreholes*, 51, Geophysics 1 (Jan., 1986), pp. 148-163.

S. L. Marple, Jr., Digital Spectral Analysis, pp. 303-349, Prentice Hall, 1987.

Capon, Greenfield and Kolker, *Multidimensional Maximum Likelihood Processing of a Large Aperture Seismic Array*, 55 Proceedings of the IEEE, 192-211 (1967).

L. Baker and G. Winbow, *Multipole P-wave Logging in Formations Altered by Drilling*, 53 Geophysics (Sep., 1988), Appendix A, at pp. 1207-1218.

R. Hamming, Numerical Methods for Scientists and Engineers, 2d Ed. (1973), pp. 68-70.

R. Wiggins, *The General Linear Inverse Problem: Implications of Surface Wave and Free Oscillations for Earth Structure*, 10 Review of Geophysics and Space Physics (1972), pp. 251-285.

MONOPOLE
DIPOLE
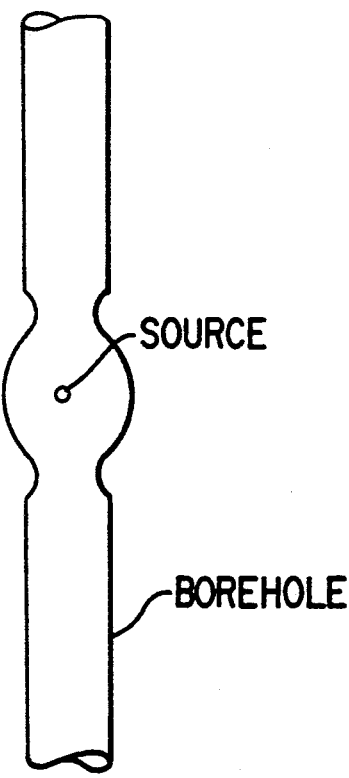
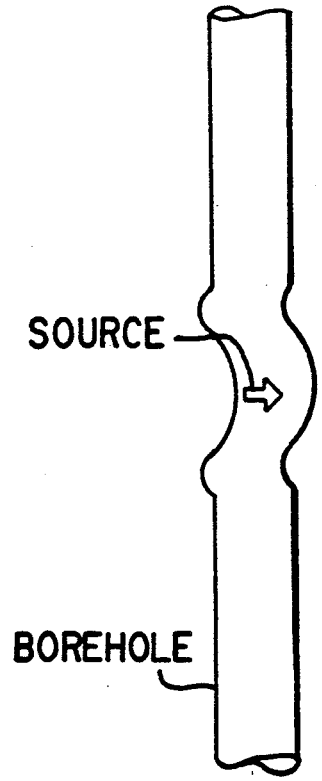
FIG.4a
PRIOR ART
FIG.5a
PRIOR ART
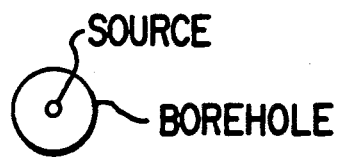
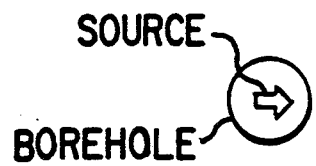
FIG.4b
PRIOR ART
FIG.5b
PRIOR ART

DISCRETE-FREQUENCY MULTIPOLE SONIC LOGGING METHODS AND APPARATUS

BACKGROUND OF THE INVENTION

1. Field of the Invention

The present invention is directed to logging of formation shear in a borehole traversing an earth formation. More particularly, the present invention is directed to logging of formation shear using discrete frequency measurements, as well as to logging in the frequency domain.

2. Background Information

It has long been an objective of the oil industry to obtain formation shear data from a sonic logging tool. See, for example, J. WHITE, THE HULA LOG: A PROPOSED ACOUSTIC TOOL, presented at the Society of Professional Well Log Analysts Conference, 1967. Shear wave data has been found useful in lithology and fluid indentification, porosity determination, measurement of rock elastic and inelastic properties, and as an adjunct to shear seismic data. See, for example, H. LESLIE and F. MONS, SONIC WAVEFORM ANALYSIS: APPLICATIONS, presented at the Society of Professional Well Log Analysts (SPWLA) Annual Logging Symposium, New Orleans, La. June 10-13, 1984.

Traditional sonic borehole logging tools have been used to acquire formation shear data. Such tools employ a monopole transmitter which emits a broad-band sound pulse, and one or more receivers which detect the pulse as it passes.

A number of such sonic logging tools have been widely used, including Schlumberger's BHC* borehole compensated sonic tool, LSS* long-spaced sonic tool, and Array Sonic* digital sonic tool. (The symbol * indicates a mark of Schlumberger.) The waveform from each receiver of such a tool is recorded as a function of time to produce a sonic log in which the time required for a sound wave to traverse a given distance of the formation is plotted versus depth in the borehole. Such tools have not, however, proven entirely satisfactory for acquisition of formation shear data. For example, it is not always possible to obtain formation shear data in "slow" formations (formations having a shear velocity less than the borehole fluid velocity). A review of how shear data is obtained with these tools helps to understand why this is so.

Propagation of the broad-band, monopole sound pulse in a borehole is governed by the mechanical properties of several separate acoustic domains. These include the formation, the borehole fluid column, and the logging tool itself. Wide-band sound energy emanating from the monopole transmitter impinges on the borehole wall, establishing compressional and shear waves in the formation, surface waves along the borehole wall, and guided waves within the fluid column. The borehole wall, formation bedding, borehole rugosity, and fractures can all represent significant acoustic discontinuities. The phenomena of wave refraction, reflection and conversion lead to the presence of many acoustic waves in the borehole when a sonic log is being run. Thus, many acoustic energy arrivals are seen by the receivers of a sonic logging tool.

The more usual acoustic energy arrivals at the receivers of a sonic logging tool having a wide-band monopole energy source are shown in the waveform examples of FIG. 1. The distinct changes corresponding to the onset of the compressional and shear arrivals and the tube (Stoneley) arrival can be seen in these examples, although the wave packets are not totally separated in time. The first arrival (the compressional wave) has traveled from the transmitter to the formation as a fluid pressure wave, has been refracted at the borehole wall, has traveled within the formation at the compressional wave velocity of the formation, and has traveled back to the receiver as a fluid pressure wave. The shear wave has traveled from the transmitter to the formation as a fluid pressure wave, has traveled within the formation at the shear wave velocity of the formation, and has traveled back to the receiver as a fluid pressure wave. The mud wave (not strongly evident in the wavetrain examples of FIG. 1) has traveled directly from transmitter to receiver in the mud column at the compressional wave velocity of the borehole fluid. The Stoneley wave is of large amplitude and has traveled from transmitter to receiver with a velocity less than that of the compressional waves in the borehole fluid.

Various waveform processing techniques have been used to find and analyze some or all of the propagating waves in composite time-domain waveforms such as those shown in FIG. 1. For example, the slowness-time coherence technique (STC) uses a semblance algorithm to detect arrivals that are coherent across the array of receiver waveforms and to estimate their interval transit time. Applying this semblance algorithm to the waveforms of FIG. 1 produces the coherence map of FIG. 2, in which regions of large coherence correspond to the compressional, shear, and Stoneley arrivals. The apex of each region defines the slowness of that wave. This process is repeated for each set of waveforms acquired by the tool and is used to produce a log of slowness versus depth such as shown in FIG. 3. In a slow formation (a formation having a shear velocity less than the borehole fluid velocity), the tool obtains real-time measurements of compressional, Stoneley and mud wave velocities, but shear wave values must be derived from these velocities.

Despite the progress made in obtaining formation shear data with the traditional monopole, time-domain logging tools, a number of difficulties remain. For example, it has often been found that the amplitude of the shear wave is insufficient for effective processing and analysis. And because the first shear wave arrival follows the compressional wave arrival, identifying the first shear arrival can be difficult or impossible.

Accordingly, various sonic tools have been proposed for directly logging formation shear, particularly in slow formations where the conventional tools having a monopole source cannot give shear wave logs directly. These tools employ dipole or other multipole (e.g., quadrupole) source and receiver transducers (rather than monopole transducers as in conventional sonic logging tools) for direct logging of shear in both fast and slow formations.

A monopole source excites azimuthally symmetric acoustic waves around the borehole, as shown diagrammatically in FIGS. 4a and 4b. As a monopole wave propagates along the hole, the wave causes the borehole cross-section to bulge and contract symmetrically. In contrast, a dipole source can be synthesized from two monopole sources of opposite polarity (i.e., the pressure of one source is positive when the other is negative and vice versa) placed on a plane perpendicular to the borehole axis. Since one side of a dipole source pushes the fluid with a positive pressure and the other side pulls with a negative pressure, a dipole source acts as a point force moving the fluid transversely to the borehole wall. Therefore, propagation of a dipole wave causes the formation surrounding the borehole to flex sideways, as shown diagrammatically in FIGS. 5a and 5b.

A dipole source must move the borehole fluid to vibrate perpendicularly to the borehole axis. This can be achieved by moving a plate in the hole. One way to move the plate is to use the concept of moving coils in a magnetic field, similar to loudspeakers. Another way is to use piezoelectric bimorphic or monomorphic benders. A bimorphic bender is made of two thin piezoelectric plates of opposite polarity bonded together. As a voltage is applied across the plates, one plate extends while the other contracts. Thus, the composite plate bends in response to applied voltage much as a bimetallic plate does in response to temperature change. When supported at the edges, the bender will move the fluid sideways as a dipole source. Other dipole source configurations are also known, such as dual volume sources, expanding rods, rare earth transducers, split cylinders, etc.

A dipole receiver must be able to sense either pressure gradient, particle acceleration, particle velocity, or particle displacement. Measuring the differential output of two hydrophones will give the pressure gradient. Accelerometers and geophones will sense particle acceleration and velocity, respectively. Variable capacitance microphones can sense the displacement of the fluid particle vibrations. These transducers vary in their sensitivities and frequency characteristics.

In contrast to the dipole transducers, which excite and detect pressure gradient or particle vibrations, a quadrupole transducer can excite and detect waves with 90-degree asymmetry. That is, as a quadrupole wave travels up the borehole, the borehole vibration will be like squeezing a paper cup in one direction. In the cross-sectional plane, the wall will squeeze in toward the axis in one direction and expand out away from the axis in the perpendicular direction. Thus, quadrupole transducers will excite and detect shear/-screw waves, in contrast to the shear/flexural of dipole transducers.

An early multipole logging tool concept was proposed by J. E. White in 1967. See J. WHITE, THE HULA LOG: A PROPOSED ACOUSTIC TOOL, paper presented at the Society of Professional Well Log Analysts Conference, 1967, and U.S. Pat. No. 3,475,722 to J. E. White. in that proposal, a cluster of piezoelectric transducers is mounted on each of several pads which are pressed against the borehole wall. The transducers of each pad are oriented along mutually orthogonal axes and selectively activated to apply force to the borehole wall in a desired direction. The tool can be operated in one of four different modes to produce torsional, flexural, radial and axial vibrations, by suitable application of voltage pulses to the source transducers. The flexural (sideways) mode of vibration is that of a dipole source.

A subsequent dipole tool concept, which does not require contact with the borehole wall, is disclosed in U.S. Pat. No. 3,593,255 to J. E. White. The transducers in that arrangement are each formed of two half-cylinder segments of piezoelectric material (barium titanate), assembled to form a cylindrical body. The segments are connected electrically such that the application of a voltage causes one segment to expand in the radial direction when the other segment contracts in the radial direction, and vice versa, thereby generating a dipole wave in the borehole. The receiver transducers are of the same construction, acting as a pressure gradient sensor at low frequencies. A voltage pulse is applied to the source transducer to produce a flexural wave in the borehole, and the response of the receiver transducer is displayed in time domain.

A further proposal for low-frequency dipole shear logging is found in C. KITSUNEZAKI, *A New Method for Shear-wave Logging*, 45 Geophysics 10, at 1489-1506 (October, 1980). In that arrangement, a force applied to a rigid body suspended in the borehole fluid produces pressure changes at front and rear surfaces of the body. The borehole wall is excited indirectly by the fluid pressure changes. The electrodynamic source transducer employs a moving coil and a permanent magnet. As shown in U.S. Pat. No. 4,207,961 to Kitsunezaki, the moving coil drives a diaphragm which displaces the fluid to excite dipole waves in the borehole. The receivers are geophone-like devices with a neutrally-buoyant body which moves relative to the logging tool in response to passage of the asymmetric dipole pressure wave. A pulse is applied to the source transducer, and the waveforms detected at the receivers are recorded in the time domain. The tool must be stationary while taking measurements. An alternate transducer construction proposed in U.S. Pat. No. 4,207,961 to Kitsunezaki has diaphragms which move up and down such that a pair of fluid chambers displace fluid in opposite directions to generate a dipole wave.

A modification of Kitsunezaki's electrodynamic transducer, disclosed in U.S. Pat. No. 4,383,591 to Ogura, generates both monopole and dipole signals. Since the original design by Kitsunezaki was unsuitable for logging shear in fast formations, a new design was developed which uses a stationary coil and a moving magnet or a magnetic material block. The moving magnet is used as a hammer to drive either a rubber or a metal plate. The frequency was extended to several kHz and the power output was increased by the new design. See K. TANAKA, S. INOUE and K. OGURA, DEVELOPMENT OF A SUSPENSION PS LOGGING SYSTEM'S SEISMIC SOURCE FOR HARD GROUND, presented at the 56th SEG Annual Meeting, Houston, Texas, Nov. 2-6, 1986.

In 1984, results of time-domain dipole shear logging using piezoelectric bimorphic bender transducers were published. See J. ZEMANEK, F. ANGONA, D. WILLIAMS and R. CALDWELL, CONTINUOUS ACOUSTIC SHEAR WAVE LOGGING, presented at the 25th SPWLA Logging Symposium, New Orleans, 1984. U.S. Pat. Nos. 4,516,228 to J. Zemanek and 4,649,525 to F. Angona et al. disclose dipole transducers, including both circular and rectangular benders. For the circular bender, the circumference of the bender element is mounted to the sonde by means of a rubber mounting ring. Two edges of the rectangular bender are mounted with rubber mounting strips. The source and receiver transducers are of similar construction. The benders have a resonant frequency such that, when a broad-band voltage pulse is applied to them, the frequency of the resulting acoustic signal ranges from about 1 kHz to 6 kHz with a predominant frequency of about 3 kHz. Benders of lower resonant frequency are also discussed.

Still other multipole logging tools have been proposed. For example, U.S. Pat. No. 4,606,014 to Winbow et al. discloses an acoustic dipole logging device in which the transducers comprise either a bimorphic bender clamped at one edge or a pair of bimorphic benders clamped at opposing edges. The source transducer is driven by a voltage pulse. The outputs of the receiver transducers are band-pass filtered and processed in time domain. U.S. Pat. No. 4,649,526 to Winbow et al. discloses an acoustic logging device with dipole or higher-order multipole transducers having multiple piezoelectric members of split-cylinder or bimorphic plate form. The source transducers are driven by voltage pulses.

U.S. Pat. No. 4,682,308 to Chung and U.K. Patent Application GB 2 158 581 A of Chen et al, filed May 2, 1985, disclose further multipole acoustic logging transducers, including such arrangements as quadrupole transducers having vertically-mounted magnetostrictive rods or piezoelectric stacks, or horizontally mounted magnetostrictive rods or piezoelectric stacks which are attached to vibrating masses.

Several other transducer arrangements have also been proposed, such as an eccentric weight vibrator and clamped geophone to measure shear in the 50 to 300 Hz frequency band (W. BENZING, EXPERIMENTATION IN DOWNHOLE SHEAR WAVE VELOCITY MEASUREMENTS, presented at the SEG Annulal Meeting, Las Vegas, Nevada, Sept. 11-15, 1983), a bender transducer having two stacks of rectangular piezoelectric bars which are pre-stressed in a mounting assembly (G. NUNN and W. CURRIE, BENDER-BAR TRANSDUCERS FOR EARTH ACOUSTIC MEASUREMENTS presentation at the Interwell Seismic Surveying Workshop, Los Alamos, New Mexico, Mar. 24-26, 1988), and a dipole transducer using four rare-earth rods to excite four mass vibrators in the frequency range of 2 kHz to 4 kHz (S. COHIC and J. BUTLER, *Rare-earth Iron Square Ring Dipole Transducer*, 72 JOURNAL OF THE ACOUSTICAL SOCIETY OF AMERICA Aug. 2, 1982). U.S. Pat. No. 4,700,803 to Mallett and Minear discloses a magnetostrictive transducer similar to that in the aforementioned U.K. Patent Application GB 2 158 581 A of Chen et al.

However, several difficulties are encountered in obtaining true formation shear from dipole waveforms. First, it has been found that a dipole source excites not only the desired shear waves, but also a borehole flexural wave. A. KURKJIAN and S. CHANG, *Acoustic Multipole Sources in Fluid-Filled Boreholes*, 51 GEOPHYSICS 1 (January, 1986), at 148–163, and U.S. Pat. Nos. 4,698,792 and 4,703,460 to Kurkjian et al. The flexural wave is dispersive (its phase velocity varies with frequency) and is excited at a greater amplitude than the formation shear by a wide-band dipole source. FIG. 6 illustrates the dispersive nature of the flexural waves as a function of frequency. The flexural wave phase velocity approaches the formation shear velocity at low frequency and gradually becomes slower at higher frequencies. FIG. 7 shows one example of the relative excitation amplitudes of the shear wave and flexural mode as functions of frequency. The direct formation shear is much weaker than the flexural wave at higher frequencies, but stronger than the flexural wave at low frequencies where the flexural wave phase velocity is close to that of the shear velocity. (As shown in the example of FIG. 7, the flexural mode is more than 20 dB stronger than the shear wave above a certain frequency.) At low frequency, the formation shear is excited more than the flexural wave. Therefore, the dipole signals can be viewed approximately as a mixture of shear and flexural wave, with a velocity dispersion following that of the flexural wave. Since the drop in low-frequency amplitude of the shear wave is quite steep, it is difficult to obtain reasonable shear signal strength without also exciting the flexural mode.

Second, to get formation shear, a dipole tool must be operated at very low frequencies where the shear excitation can be very weak.

Third, road noise (the noise generated by the sonde traveling in the borehole) can be very significant at low frequencies. Transverse vibration of the tool is generally detected by the dipole receivers. It has been found that road noise energy is mainly concentrated below 1 kHz and that, in general, road noise increases with increased logging speed.

Finally, the hole conditions in soft rocks can be poor, frequently making the dipole signals very weak in soft rock wells. Of all these difficulties, signal-to-noise ratio and wave dispersion are of primary concern.

As noted above, sonic logging measurements have traditionally been made in time domain: a broad-band sonic energy source excites propagation of sonic waves in the borehole, and waveforms detected at an array of receiver locations spaced from the source in the borehole are recorded as functions of time. Shear wave velocity at the dominant frequency is then estimated by waveform stacking techniques, such as semblance or radon transforms. However, time-domain recording has several disadvantages if the frequency domain results are desired. The waveforms must be sampled in small time steps over a long period, resulting in a large set of data to transmit, store, and process. The truncation in time can cause interference in the processing. In addition, the signal to noise ratio can be quite small for the wide-band transient measurements. The noise problem can be significant for low frequency data (less than 1000 Hz) because of the noises generated by the sonde traveling in the borehole.

In accordance with the present invention, measurements are taken in frequency domain, thereby avoiding the above-noted problems. A frequency domain measurement is desirable for a tool that gives a single dominant arrival. This is particularly true if the arrival is dispersive, as is the case with the shear/flexural arrival of dipole waves.

In contrast to the traditional time-domain logging techniques, U.S. Pat. No. 3,330,375, issued July 11, 1967 to J.E. White proposes a form of acoustic well logging in which the propagation velocities of compressional, shear, mud and casing waves are determined from the expression velocity=frequency×wavelength by employing transmitter and/or receiver tuning techniques to determine the wavelength for a known frequency. A variety of such techniques are disclosed, involving wavelength tuning by varying frequency and/or phase shift. In all the techniques, frequency and/or phase shift is adjusted until an amplitude peak is observed, the frequencies which produce such amplitude peaks are noted, and wave propagation velocity is calculated from the expression given above. In one such technique, the wavelength of the transmitted signal is tuned to a fixed wavelength of the transmitting and receiving arrays by varying its frequency. In another, the wavelength of the arrays is tuned to a fixed value of the transmitted wavelength by varying the phase shift between adjacent transducer elements. In another, the frequency of the transmitted signal or the phase shift between adjacent receiving transducers, or both, are varied.

The logging techniques of U.S. Pat. No. 3,330,375 would have a number of disadvantages for shear/flexural or shear/screw wave logging. For example, use of monopole sources significantly reduces the signal-to-noise ratio of the shear/flexural waves, since much of the emitted sonic energy from the monopole source will propagate in compressional rather than shear/flexural mode. Further, the disclosed method and apparatus are directed to determination of wave velocity, and do not provide for logging of amplitude and phase so that both velocity and attenuation can be determined as functions of frequency. Because of the dispersive nature of the shear/flexural mode (wave velocity varies with frequency), both amplitude and phase (or real and imaginary parts) of shear wave energy are needed to understand the dispersion. Furthermore, the disclosed method requires downhole tuning of the frequency and/or the wavelength while acquiring the data. The method is not directly applicable to obtain the frequency dependent characteristics of dispersive waves, such as the shear/flexural or shear/screw waves.

In another approach, U.S. Pat. No. 4,419,748, issued Dec. 6, 1983 to R. W. Siegfried, II., proposes a continuous wave sonic logging method in which a continuous sine wave at a single frequency is emitted and received, and a spatial Fourier transform is performed over the receiver array. The resulting spatial frequency components are then used to indicate the velocities of various sonic paths. The logging method of U.S. Pat. No. 4,419,748 would have several disadvantages for multipole shear logging. For example, the method requires a large number of receivers in order to facilitate the spatial Fourier transforms. Further, the disclosed method records the instantaneous values of the received signal; that is, it is recorded in time domain. Therefore, the measurement is subject to noise interferences. No improvement in the signal to noise ratio is realized by the proposed method. Furthermore, the measurement can only be done one frequency per logging run (due to the time domain recording). This would require numerous logging runs for the dispersive waves, for which the wave characteristics are functions of frequency. Since the logging time is a costly factor in wire line logging services, the method is not practical for logging dispersive waves.

It is an object of the present invention to provide methods and apparatus for borehole shear/flexural logging in which the aforementioned disadvantages of the prior art are avoided.

It is a further object of the present invention to provide methods and apparatus for borehole shear wave logging in which amplitude and phase (or real and imaginary parts) of shear/flexural energy propagated in the borehole and surrounding formation are detected for use in determining parameters such as shear wave phase velocity and shear wave attenuation as functions of frequency.

These and other objects of the present invention will become apparent from the description which follows with reference to the accompanying drawing.

SUMMARY OF THE INVENTION

The present invention is directed to methods and apparatus for sonic shear logging of boreholes using discrete frequency measurements. In a preferred form of the invention a multipole source transducer emits sonic energy at a location in a borehole of at least one discrete frequency which induces propagation of multipole sonic waves in the borehole; sonic energy of the multipole sonic waves is received at multiple multipole receiver locations in the borehole, the multiple receiver locations being spaced apart from one another and from the source transducer location; and for each receiver location, amplitude of the received sonic energy of the multipole sonic waves is detected and phase of the received sonic energy of the multipole sonic waves relative to a phase reference is detected. The source transducer may be driven continuously at one or a plurality of discrete frequencies, or may be driven intermittently, or may be driven alternately from a plurality of sources which provide one or a plurality of discrete frequencies. In one preferred form, the source transducer is driven from a repetitive signal pattern to emit sonic energy at a plurality of discrete frequencies. The phase reference is preferably derived from the same signal source which drives the source transducer.

Shear logs are preferably obtained by sorting the dispersion results after processing the discrete frequency data. The detected amplitude and phase of the received sonic energy of the multipole sonic waves may be processed to determine wave phase velocity and wave attenuation at discrete frequencies and to calculate velocity and attenuation as a function of frequency. The multipole sonic wave data are useful, for example, in lithology and fluid identification, porosity determination, measurement of rock elastic and inelastic properties, and as an adjunct to shear seismic data. A number of different techniques may be used to process the multipole sonic wave data, such as three receiver analytical solutions, least square fittings, two receiver phase difference and amplitude ratio, Prony's method, conventional beamforming, and the maximum likelihood method.

BRIEF DESCRIPTION OF THE DRAWING

FIGS. 4a and 4b illustrate diagrammatically in cross-sectional elevation and plan views, respectively, the azimuthally-symmetric acoustic waves excited by a monopole source in the formation surrounding a borehole;

FIGS. 5a and 5b illustrate diagrammatically in cross-sectional elevation and plan views, respectively, the azimuthally-asymmetric acoustic waves excited by a dipole source in the formation surrounding a borehole;

DETAILED DESCRIPTION OF THE PREFERRED EMBODIMENTS

Figure 8:
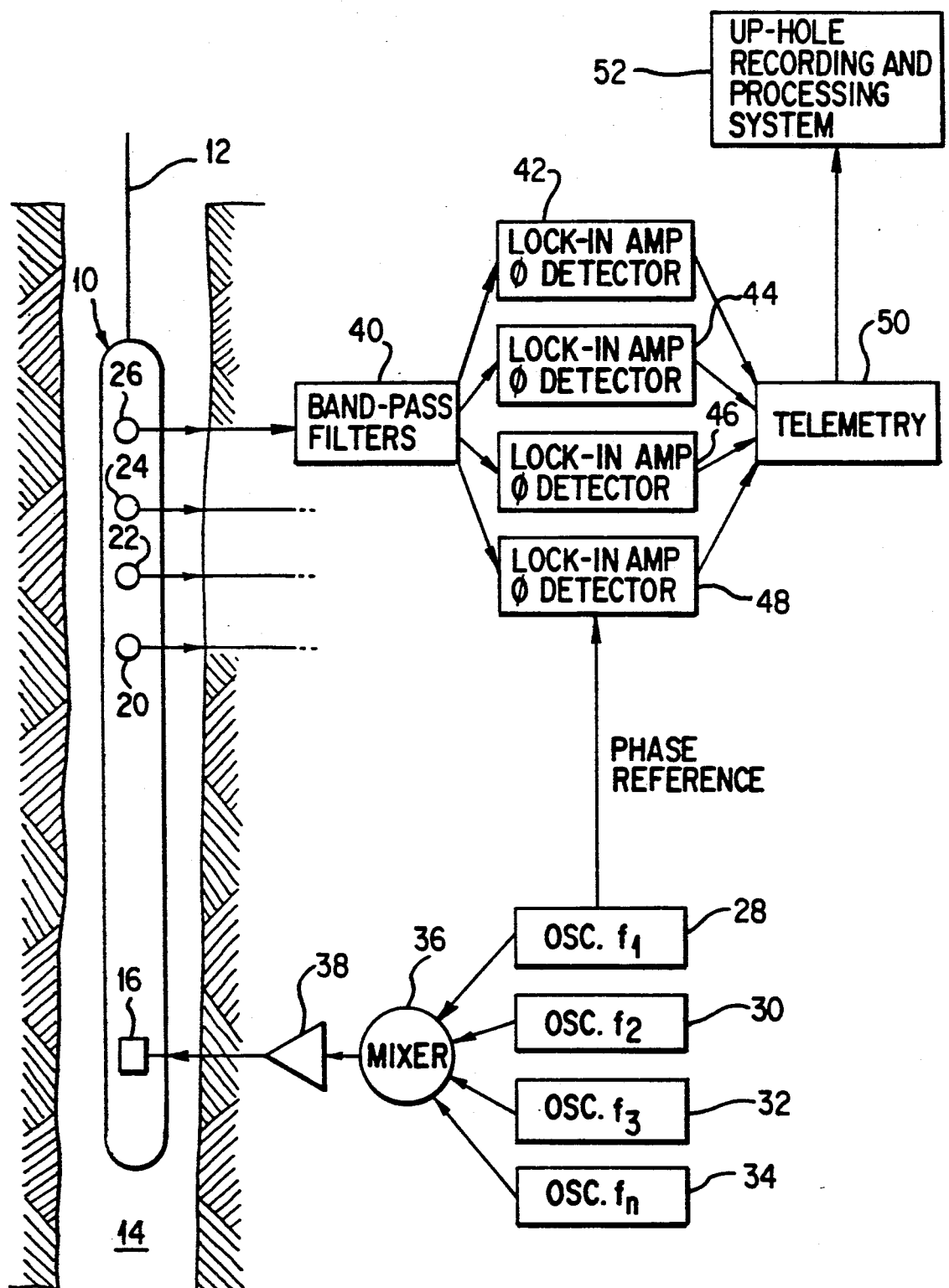
FIG. 8 shows in schematic block form a first preferred embodiment of a discrete-frequency dipole logging apparatus for shear/flexural logging in accordance with the invention.

FIG. 8 shows in schematic block form a first preferred embodiment of a logging apparatus in accordance with the present invention, useful for obtaining shear/flexural data at discrete frequencies. Referring to FIG. 8, acoustic logging sonde 10 is shown suspended by cable 12 in borehole 14 in the earth. Borehole 14 is filled with drilling mud or other fluids (not illustrated). Logging sonde 10 preferably includes dipole transmitting, or source, transducer 16 and a plurality of dipole receiving transducers 20-26 arrayed at locations spaced apart from one another and from source transducer 16 along sonde 10. While FIG. 8 shows four receiving transducers, more or fewer transducers may be used, although it will be seen from the data processing techniques described below that at least two receiving transducers are preferred.

Narrow-band transducer drivers (such as discrete frequency oscillators) 28, 30, 32 and 34, generate sinusoidal signals at one or more discrete frequencies $f_1$, $f_2$, $f_3$, ... $f_n$. If multiple discrete frequencies are produced, the signals are then mixed in signal mixer 36. The output signal from mixer 36 is then passed through amplifier 38 to drive source transducer 16. The signals may be continuous, or may be transmitted in brief bursts of sufficient duration (for example, on the order of 10 or 20 cycles per burst) to approximate a continuous wave for purposes of exciting propagation of shear/flexural waves in the borehole at the desired frequency or frequencies. When so driven, source transducer 16 induces propagation of shear/flexural waves in the earth formation surrounding the borehole at the prescribed frequency or frequencies. The shear/flexural waves are detected at receiving transducers 20-26. The signal output from each of receiving transducers 20-26 is separated into a respective signal at each of the discrete frequencies of interest ($f_1$, $f_2$, $f_3$, ... $f_n$) by a plurality of band-pass filters (shown generally at 40). The output signal from each of band-pass filters 40 is supplied to a respective one of lock-in amplifier and phase-detector circuits 42, 44, 46, 48, which detects the amplitude and phase (or real and imaginary parts) of the received waves at a respective one of the selected discrete frequencies $f_1$, $f_2$, $f_3$, ... $f_n$. Each of lock-in amplifier and phase-detector circuits 42, 44, 46, 48, also receives a phase reference signal from a respective one of oscillators 28, 30, 32, 34. The phase reference signals are preferably the signals generated by oscillators 28, 30, 32, 34 for driving source tranducer 16. Data detected by lock-in amplifiers 32 is passed to conventional telemetry circuitry 50 for transmission to up-hole system 52 where the data is recorded and/or processed. Oscillators 28, 30, 32, 34, mixer and 36, power amplifier 38, band-pass filters 40, lock-in amplifier and phase-detector circuits 42, 44, 46, 48 and telemetry circuitry 50 are preferably built into sonde 10. Telemetry circuitry 50 preferably transmits data output from lock-in amplifiers 36 to up-hole recording and processing system 52 via cable 12 or any other suitable means. Alternatively, the data may be stored in the sonde and retrieved once the sonde has been removed from the borehole.

Source transducer 16 may be any type of dipole wave source suitable for shear/flexural wave logging. Transducer 16 may be made of piezoelectric ceramics made in benders or cylindrical sections, magnetostrictive transducers, or electrodynamic vibrators, or may be of any other suitable construction. The preferred source transducers are moving coil electrodynamic transducers, piezoelectric bimorph benders, or piezoelectric monomorph benders. Source transducer 16 may be driven in any manner suitable for exciting propagation of shear/flexural waves in the formation surrounding the borehole at one or more discrete frequencies, only some of which will be described herein.

Receiving transducers 20-26 are likewise any type of dipole transducers which detect pressure gradients or particle vibrations (acceleration, velocity or displacement). The preferred receiver transducers include dual hydrophones, benders, and electrodynamic transducers. The source and reciving transducers should satisfy the usual logging tool specifications on temperature, pressure, maximum diameter, shock and vibration, and mechanical strength.

The frequency at which the flexural waves have near shear velocity can be estimated by the following formula:

$$f \approx \frac{v_s}{2\pi a}$$

where $v_s$ is the formation shear velocity and a is the borehole radius. It is preferred that the excitation frequency be kept as low as possible to ensure that the formation shear is measurable. As a guideline, the circumference of the borehole should be larger than a shear wavelength and smaller than twice the shear wavelength. That is, the preferred frequency band is:

$$\frac{V_s}{2\pi a} < f < \frac{2V_s}{2\pi a}$$

where f is the frequency, $V_s$ is the formation shear velocity, and a is the borehole radius. For example, the frequency range is about 1 kHz to 2 kHz for an 8-inch diameter hole with a 450 μs/ft shear slowness. The frequency range would be reduced to between 500 Hz and 1 kHz for a 16-inch diameter hole with the same shear slowness.

To summarize, the frequency for dipole shear logging should be lower for larger holes and for formations with slower shear. A typical frequency band is from 500 Hz to 5 kHz, for shear slowness up to 450 μs/ft and borehole diameter up to 16 inches. Another consideration is the shale alteration, where the formation near the well is substantially softer than the unaltered formation. In this case, the effective size of the borehole is bigger and the frequency range employed should be lower than that used for a simple borehole in a faster formation.

The foregoing open-hole frequency considerations can also be applied to cased holes. In cased holes, it is preferred to limit the frequency to a frequency lower than that which gives a casing shear wavelength equal to the casing circumference. And, if the casing is unbonded by the cement, the preferred frequency f should also be selected such that $f < [(\text{velocity of shear in the steel casing})/(2\pi \times \text{mean casing radius})]$. This is a frequency at which the mean circumference of the casing is one wavelength of the shear in the casing steel.

Because of road noise (the noise generated by the sonde traveling in the borehole), a high-power dipole source transducer is desirable for low-frequency operations (particularly below 1 kHz) in slow formation and/or large hole environments. Stronger transducer output gives larger signal-to-noise ratio, and allows for faster logging speed.

Other considerations in designing and operating a sonde in accordance with the invention include sonde housing wave coupling, impedance matching, efficiency, sensitivity of receivers, etc. One way to reduce the sonde coupling is to reduce the mass of the vibrating element of the source transducer, so that the mass of the vibrating element is small relative to that of the stationary sonde structure. It is also preferred to mechanically isolate the transducers from the rigid sonde housing structure, such as by means of an isolation section.

Figure 9:
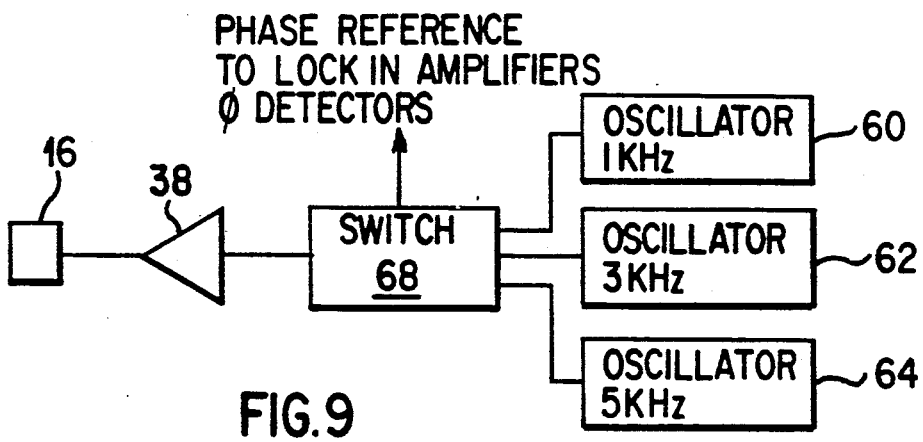
FIG. 9 shows in schematic block form a modification of the embodiment of FIG. 8 which permits multiple, discrete frequencies to be emitted sequentially in bursts for shear/flexural logging in accordance with the invention.

FIG. 9 shows in schematic block form a modification of the embodiment of FIG. 8 which permits multiple, discrete frequencies to be emitted in sequential bursts for shear/flexural logging in accordance with the invention. A plurality of oscillators, for example three oscillators 60, 62 and 64, generate sinusoidal signals at respective frequencies suitable for exciting shear/flexural waves in the borehole, for example at frequencies of 1 KHz, 3 KHz and 5 KHz. Suitable switching means 68 alternately passes multi-cycle bursts of the respective frequencies to power amplifier 38 to drive transducer 16 and to lock-in amplifiers 42–48 (FIG. 8) for use as phase references. The multi-cycle bursts are of sufficient length (for example, 10 to 20 cycles) to effectively simulate a continuous signal for purposes of exciting shear/flexural propagation in the borehole at the selected frequencies.

A further modification of the embodiment of FIG. 8 may be made which permits driving the source transducer or transducers at a desired set of frequencies by using a repetitive signal sequence. If the period of the sequence is $\tau$, then a discrete frequency spectrum at $f = n/\tau$ is obtained, where $n = 1, 2, 3$, etc. The amplitude distribution for the frequencies of interest can be designed by the shape of the waveform of the sequence. In other words, the shape of the waveform can be designed such that a desired discrete frequency spectrum is obtained. This may be achieved by first specifying the amplitude distribution for the discrete frequencies, and then by summing the Fourier series of all the discrete frequency terms with the pre-assigned amplitude distribution.

Figure 10:
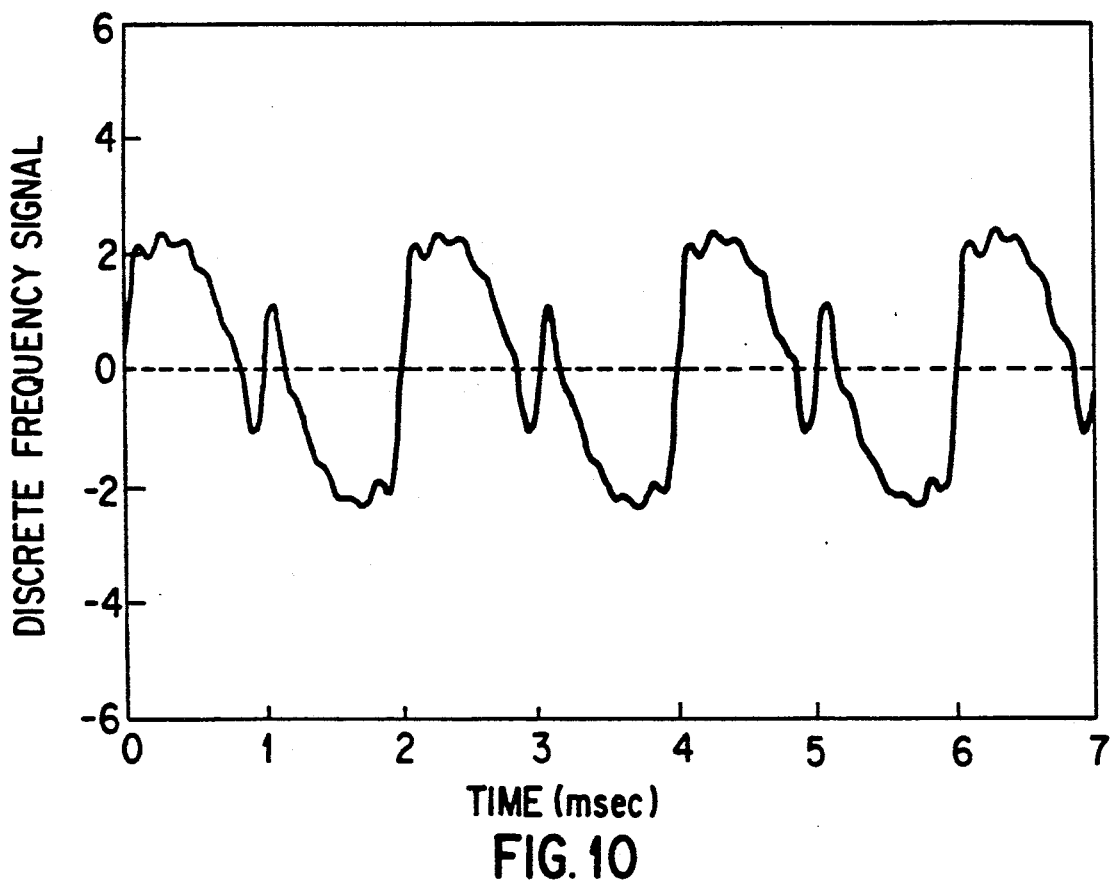
FIG. 10 shows amplitude of a periodic signal as a function of time, the signal having a discrete frequency spectrum as shown in FIG. 11.
Figure 11:
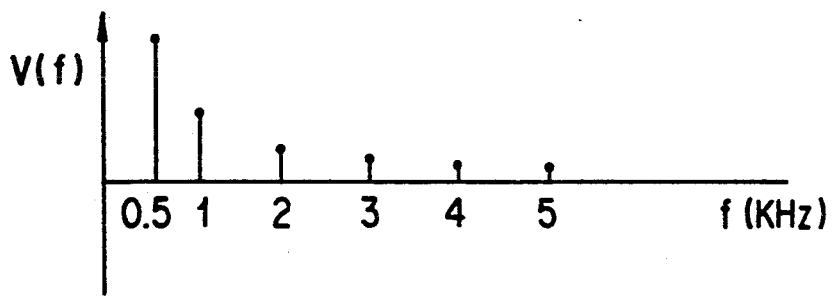
FIG. 11 shows amplitude of the discrete frequencies of the signal of FIG. 10.

One example of such a repetitive signal sequence is given in FIG. 10, which shows the amplitude of a periodic signal as a function of time. This periodic signal has a discrete frequency spectrum at $f_n = 0.5, 1, 2, 3, 4, 5$ kilohertz. The Fourier amplitude for each frequency is inversely proportional to $f_n$. Thus, the Fourier spectrum of the signal of FIG. 10 is as shown in FIG. 11. For purposes of the present invention, the Fourier spectrum of the signal preferably has much higher energy in its lower frequency components than in its higher frequency components. This is because the upper frequency boundary for the energy of shear/flexural waves propagating in a borehole is about 5 KHz for boreholes of a diameter typically encountered in oilfield well logging. (It will be recalled that this upper frequency boundary is dependent on borehole diameter and the formation surrounding the borehole.) Greater energy at the low-frequency end of the spectrum will thus provide greater signal-to-noise ratio of the shear/flexural waves. Selecting minimum and maximum frequencies of $f_{min}$ and $f_{max}$, respectively, then the periodicity of the signal may be chosen such that $\tau = 1/f_{min}$, if every $f_n$ is an integer multiple of the minimum frequency, $f_{min}$.

A low-pass filter can be applied to the periodic signal to eliminate the harmonics above $f_{max}$. Other (e.g., square-wave, saw-tooth, specially-designed pulse shape, etc.) periodic signals may also be used for exciting discrete frequency signals.

Figure 12:
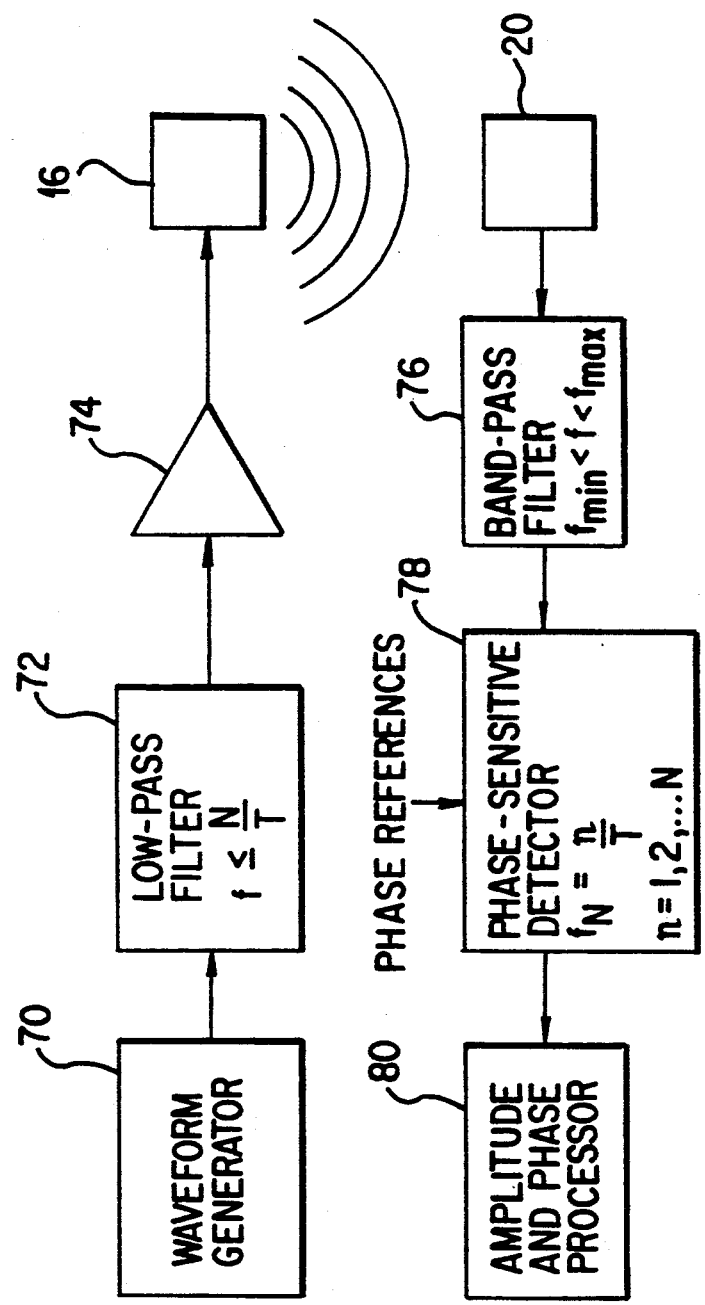
FIG. 12 shows in schematic block form a further modification of the embodiment of FIG. 8 which permits multiple, discrete frequencies to be emitted simultaneously for shear/flexural logging in accordance with the invention.

FIG. 12 shows in schematic block form a modification of the embodiment of FIG. 8 which permits multiple, discrete frequencies to be emitted simultaneously for shear-wave logging in accordance with the invention. Referring to FIG. 12, the output signal from waveform generator 70 is supplied to low-pass filter 72 which passes frequencies $f \leq f_{max}$. The filtered signal is then passed through power amplifier 74 to drive source transducer 16. The emitted sonic energy from source transducer 16 excites shear/flexural wave propagation in the borehole and the shear/flexural waves are received at each of the spaced-apart receiving transducers, only one of which is shown (at 20) in FIG. 12. The output signal from each of the receiving transducers is passed through a respective band pass filter (one of which is shown at 76 in FIG. 12) having a pass-band frequency characteristic $f_{min} < f < f_{max}$. The filtered signal is then supplied to the input of a phase-sensitive detector circuit (one of which is shown at 78 in FIG. 12) which detects the phase of each frequency component of the filtered signal relative to a respective phase reference signal, as well as the amplitude of each frequency component. The phase reference signals may be obtained from the circuitry which drives source transducer 16. Phase-sensitive detector 78 may be of any suitable analog, digital or hybrid construction. The phase and amplitude data for each frequency is passed by suitable means (for example, via telemetry to an up-hole site) from phase-sensitive detector 78 to a processor 80 which makes use of the data for any of a number of purposes, some of which are described below.

As noted above, the upper frequency boundary for the energy of shear/flexural waves propagating in a borehole is about 5 KHz for boreholes of a diameter typically encountered in oilfield well logging. This upper frequency boundary is dependent on borehole diameter and the formation surrounding the borehole. Thus, the discrete frequencies at which shear/flexural waves are to be excited in the borehole preferably includes a number of discrete frequencies up to the upper frequency boundary, for example, 0.5 KHz, 1 KHz, 2 KHz, 3 KHz, 4 KHz and 5 KHz. Spacing of the receiving transducers is not critical, but is preferably such that the length of the receiving transducer array is not substantially less than the wavelength in order to accurately determine the shear/flexural wave phase velocity.

Further modification of the embodiments of FIGS. 8, 9 and 12 is also possible within the spirit and scope of the present invention. For example, quadrupole or other higher-order multipole transducers may be used.

Several differences between dipole and quadrupole shear logging should be noted. Dipole logging uses dipole transducers which excite and record pressure gradient or particle vibrations. Quadrupole logging uses quadrupole transducers which excite and detect waves with 90-degree asymmetry. As a quadrupole wave travels up the borehole, the borehole vibration will be like squeezing a paper cup in one direction. In the cross-sectional plane, the wall will squeeze in toward the axis in one direction and expand out away from the axis in the perpendicular direction. The quadrupole receivers are designed to sense this kind of vibration.

Second, the quadrupole transducers will excite and detect shear/screw waves, rather than the shear/flexural waves of dipole transducers. Shear/flexural wave, shear/screw waves, and other higher-order multipole waves are collectively referred to herein as multipole sonic waves.

Third, the frequency selection for quadrupole logging will be different from that for dipole logging. For quadrupole logging, the rule of thumb will be that the circumference of the borehole should be larger than two shear wavelengths and smaller than three shear wavelengths. That is, the preferred frequency band is:

$$\frac{2V_s}{2\pi a} < f < \frac{3V_s}{2\pi a}$$

where f is the frequency, $V_s$ is the formation shear velocity, and $a$ is the borehole radius.

Measuring multipole sonic waves (e.g., dipole shear-/flexural waves or quadrupole shear/screw waves) in frequency domain offers several advantages. For example, measurements in frequency domain give higher signal-to-noise ratio than do time domain measurements. This is because the signal-to-noise ratio is inversely proportional to the bandwidth of the signal, and the bandwidth of the signal can be made extremely narrow when working with discrete frequencies. Also, as there is no need to record waveforms, the quantity of data to be transferred up-hole via the telemetry and cable is much less than that for traditional time-domain sonic waveforms. Thus, the logging speed can be increased. Additionally, as there is no need to transform the waveforms from time domain to frequency domain, the processing is simplified. Further, transducer calibration at specific frequencies is more reliable than is transducer calibration for the broad-band time domain sondes. Measurement in the frequency domain, as well as the use of discrete frequencies, are believed to make the methods and apparatus of the present invention more accurate than traditional time-domain sonic logging for obtaining the frequency-dependent information of multipole sonic (e.g., shear/flexural or shear/screw) waves.

The data obtained with the methods and apparatus of the present invention are the complex values of the dipole (or other multipole) signal at each receiver for each frequency. It is well known that a complex value can be expressed in two forms: the amplitude and phase, or the real and imaginary parts. Since the optimal frequency for the multipole tool can vary with formation shear and borehole diameter, it is preferred that waveforms are recorded at more than one frequency. Preferably, the low and high frequency limits are first selected. For example, these may be 100 Hz and 5000 Hz for a dipole tool. Several discrete frequencies are selected between the frequency limits. The data at each frequency is preferably then processed to obtain shear velocity using one of the methods described below. By sorting the frequency-dependent velocity and amplitude data at the selected frequencies, the best choice of formation shear parameters can then be made by cross-checking with the theoretical models.

Figure 1:
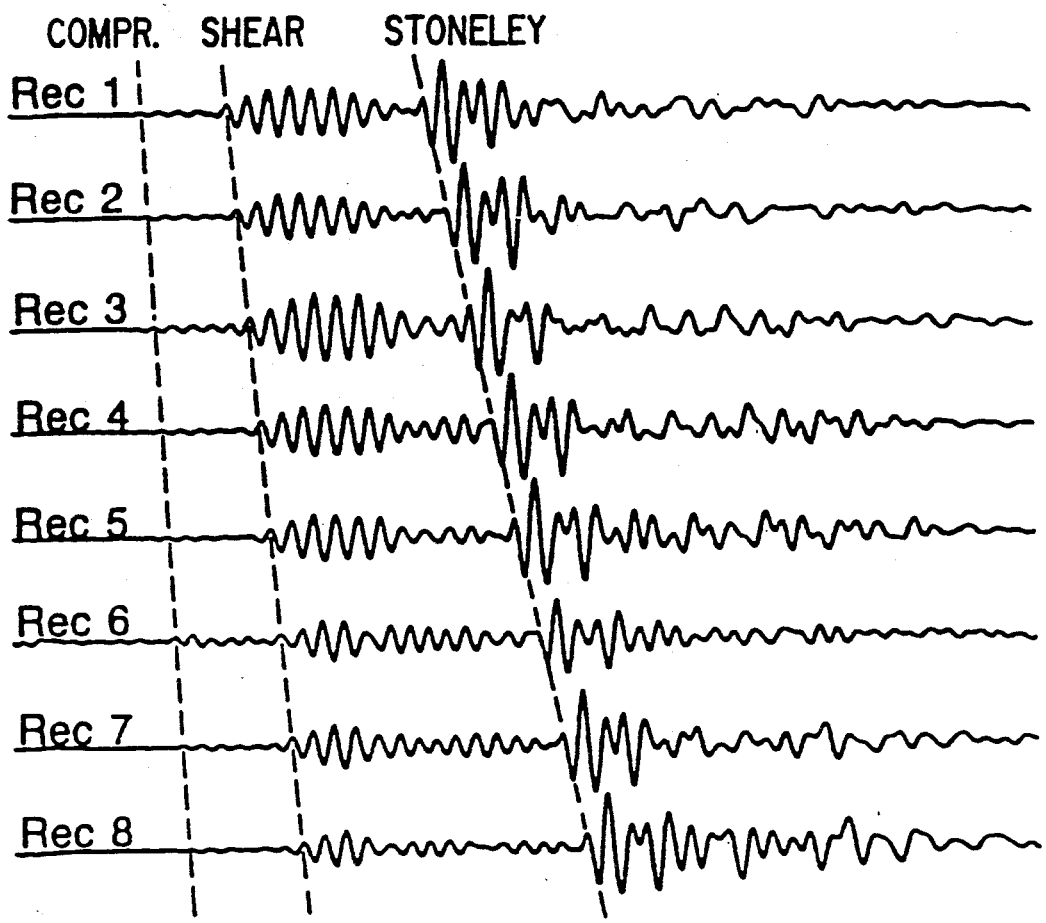
FIG. 1 shows waveform displays of typical acoustic energy arrivals at the receivers of a sonic logging tool having a wide-band monopole energy source.
Figure 2:
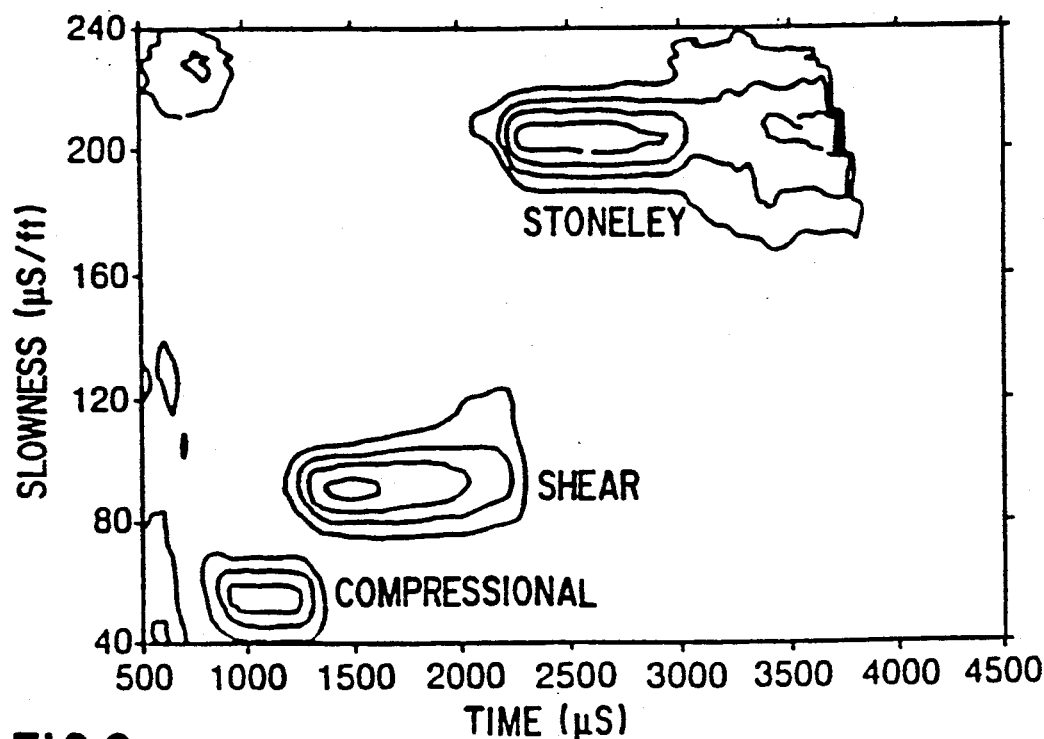
FIG. 2 shows a slowness-time coherence map resulting from the application of a typical semblance algorithm to the waveforms of FIG. 1.
Figure 3:
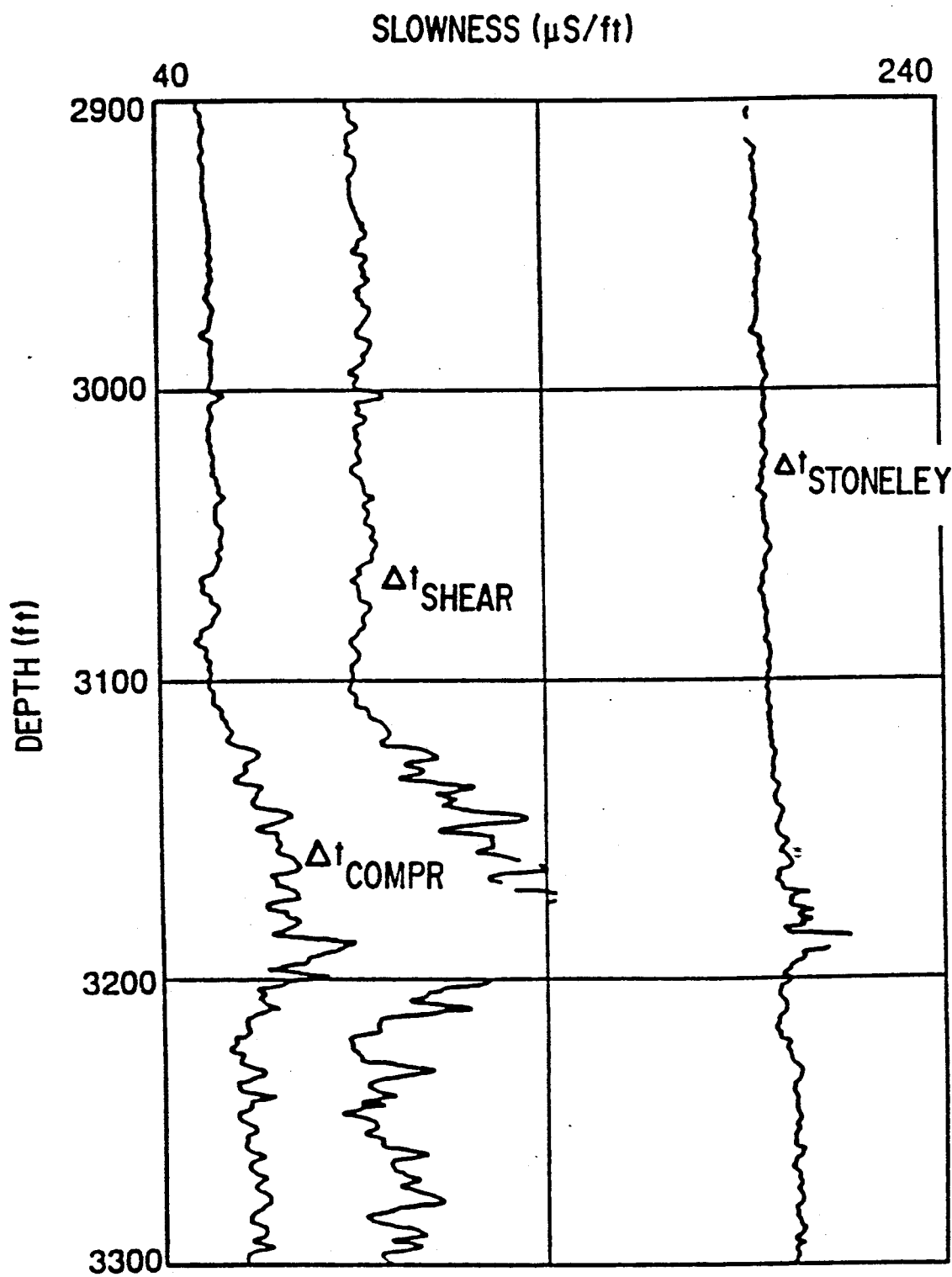
FIG. 3 shows a log of slowness versus depth for the data of FIGS. 1 and 2.
Figure 6:
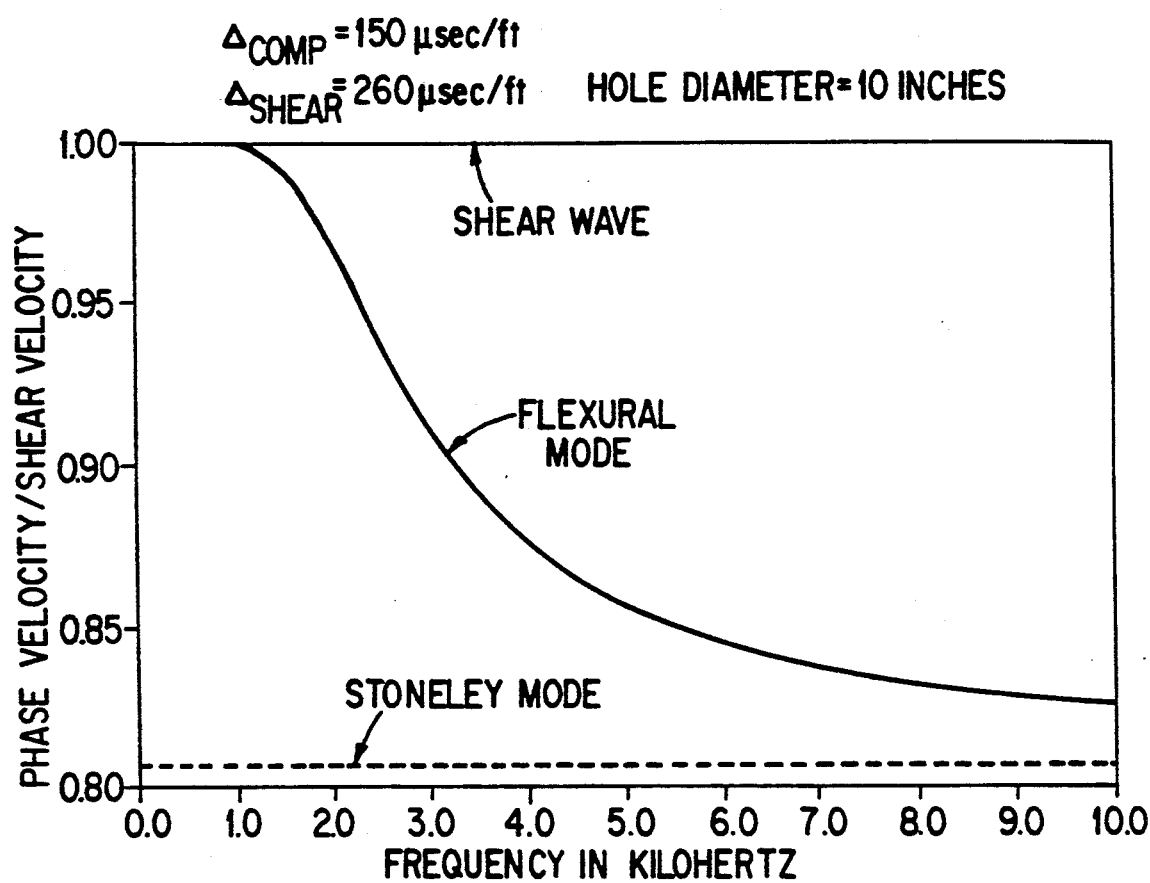
FIG. 6 is an example of a plot of the ratio of flexural mode phase velocity to shear wave velocity as a function of frequency, illustrating the dispersive nature of flexural waves, and illustrating that the flexural wave phase velocity approaches the formation shear velocity at low frequency and gradually becomes slower at higher frequencies.
Figure 7:
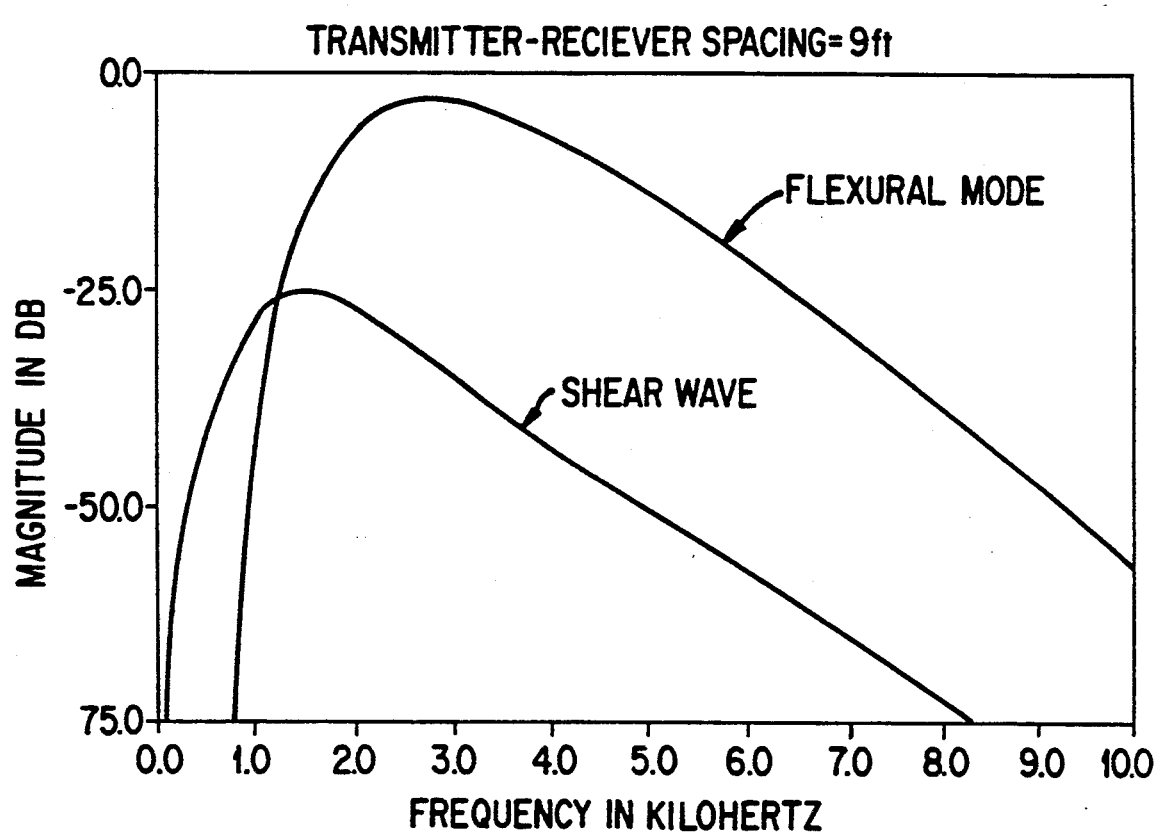
FIG. 7 is an example of a plot of flexural mode and shear wave amplitude as a function of frequency.

For example, one approach to obtain shear velocity is to select the velocity and amplitude at the lowest possible frequency which has a reasonable signal-to-noise ratio. One way to judge the signal-to-noise ratio is to compare the results with those at other frequencies. Since the velocity as a function of frequency is smooth and predictable by theory, the quality of the signal, or the signal-to-noise ratio is small, when the slowness estimates are out of line from the trend produced at other frequencies. Another way is to check the coherence of the signal across the receiver array. For example, the residual of the least square fitting may be checked in the Prony's method, or the value of beamforming function $\rho(k)$ of equation (11) below or the likelihood value $L(k)$ of equation (12) below at their optimal value. From the theoretical results of A. KURKJIAN and S. CHANG, *Acoustic Multipole Sources in Fluid-Filled Boreholes*, 51 GEOPHYSICS 1, January, 1986 (incorporated herein for all purposes by this reference), at 148–163, or from FIG. 6, the low-frequency limit of the shear/flexural or shear/screw velocity is the formation shear velocity. Another approach is to first obtain the velocity as a function of frequency from the borehole measurements, and then search for the formation shear velocity by using curve-fitting methods, such as a least-square method or a generalized linear-inversion method. The theory has been explicitly shown in A. KURKJIAN and S. CHANG, *Acoustic Multipole Sources in Fluid-Filled Boreholes*, 51 GEOPHYSICS 1, January, 1986, at 148–163. Explicitly, this procedure is expressed in two ways:

1. Find the shear velocity $v_{shear}$ such that:

$$\sum_{i=1,\ldots,N} w_i |v_{fl}(f_i) - v_{fl}^*(f_i)|^2 \text{ is minimum,}$$

where $v_{fl}$ is the measured flexural- or screw-wave or other higher-order multipole wave velocity, $v_{fl}^*$ is the theoretically-calculated flexural- or screw-wave or other higher-order multipole wave velocity, and $w_i$ is a weighting function which can be chosen to be one or a function of wave amplitude at the i-th frequency.

2. Find the shear velocity $v_{shear}$ such that:

$$\max_{i=1,\ldots,N} |v_{fl}(f_i) - v_{fl}^*(f_i)| \text{ is minimum,}$$

The approach to solving these problems need not be described here, since it is well known in general. See, for example, R. HAMMING, NUMERICAL METHODS FOR SCIENTISTS AND ENGINEERS, 2d Ed., 1973 (incorporated herein for all purposes by this reference), at pages 68-70 (Newton's Method), and R. WIGGINS, *The General Linear Inverse Problem: Implications of Surface Wave and Free Oscillations for Earth Structure*, 10 REVIEWS OF GEOPHYSICS AND SPACE PHYSICS 1, 1972 (incorporated herein for all purposes by this reference), at pages 251-285 (general linear inverse).

Those of skill in the art will recognize that the minimization can be done over other norms of the differences between the measured and theoretical velocity functions (the norms used above are square and linear norms) with proper choices of the weighting functions.

The measurement can be made simultaneously for all the frequency points. The frequency oscillators can be mixed and employed to drive the transmitter simultaneously at all the desired frequencies. Narrow-band filters are applied to the received signals to separate the data at the different frequencies.

In the following, selected prior art processing techniques are described which may be used to extract information from the measured data. Other processing techniques may also be employed.

1. TWO RECEIVER TECHNIQUE

As a wave travels in the borehole in one direction, the detected-signal function can be expressed in the following form:

$$P_g(z,f) = A(f) e^{-\alpha z} e^{i2\pi(f/v)z} \quad (1)$$

where $P_g$ is the detected signal (representing pressure gradient or other received quantities such as particle displacement, velocity, acceleration, etc.); A is the amplitude function which is independent of transmitter-receiver spacings; z is the transmitter-receiver spacing; f is the frequency; $v$ is the wave velocity; and $\alpha$ is the attenuation constant.

If the complex detected-signal function is measured at two receiver locations, $z_1$ and $z_2$, the wave velocity $v(f)$ and attenuation constant $\alpha$ may be calculated according to the following formulas:

$$v(f)^{-1} = [\text{phase}(P_g(z_1,f)) - \text{phase}(P_g(z_2,f))]/2\pi f(z_1 - z_2) \quad (2a)$$

$$\alpha = \ln[abs(P_g(z_2,f)/P_g(z_1,f))]/(z_1 - z_2) \quad (2b)$$

The two receiver method has one constraint; the wave must be traveling in only one direction. If there are significant reflection signals from tool housing structure, bed boundaries, or fractures, then other processing procedures should be used which can include both forward and backward traveling waves.

2. THREE RECEIVER TECHNIQUE

Waves can be reflected, either by the borehole/formation inhomogeneity or by the sonde housing structure. With the shear wave traveling up and down the borehole, the detected-signal function can be expressed as:

$$P_g(z,t) = A e^{ikz} + B e^{-ikz} \quad (3a)$$

where k is the complex wave-number of the wave.

$$k = 2\pi(f/v) + i\alpha \quad (3b)$$

If $P_n$ is defined as the detected signal, representing pressure gradient or other received quantities (a complex value) of the n-th receiver located at $z_n$, and if the receivers are equally spaced at interval of $\Delta z$, then Equation (3a) can be rewritten as $$P_n = A e^{ikzn} + B e^{-ikzn} \quad (4)$$

Taking the data from only three receivers, and defining $A' = A e^{ikz2}$, $B' = B e^{-ikz2}$ and $G = e^{ik\Delta z}$, then the following equations result:

$$P_1 = A'G^{-1} + B'G \quad (5a)$$

$$P_2 = A' + B' \quad (5b)$$

$$P_3 = A'G + B'G^{-1} \quad (5c)$$

Eliminating A' and B', Equations (5a)-(5c) can be reduced to a quadratic equation of G. The solution of the quadratic equation is $$G = \frac{(P_1 + P_3) \pm \sqrt{(P_1 + P_3)^2 - 4P_2^2}}{2P_2} \quad (6)$$

Once G is solved, k can be obtained from the expression $k = (\ln G)/(i\Delta z)$. The wave phase velocity, $v$, and the wave attenuation constant, $\alpha$, can then be calculated from Equation (3b). Solving for A' and B' from Equations (5a), (5b) and (5c), the following expressions are obtained:

$$A' = \frac{P_2 - P_3 G}{1 - G^2} \quad (7a)$$

$$B' = P_1 - A' \quad (7b)$$

The wave reflection coefficient can be obtained from the ratio of B' and A' with proper exponential factors.

3. ARRAY TECHNIQUES

Any of a number of known techniques may be used to process data from an array of receivers, such as: least square method, Prony's method, maximum likelihood method, and others.

In the least square method, A and B and k are found such that $$R = \sum_{n=1}^{n=N} [abs(P_n - A e^{ikzn} - B e^{-ikzn})]^2 \quad (8)$$

is minimized. Here, the total number of receivers in the array is N. The least square method is feasible if the waveforms have only one arrival at the receivers (so that Equation (4) is valid). If there are other arrivals, such as compressional, fluid, tool arrivals and other waves, then special spectral estimation techniques (Prony's method, conventional beam-forming, maximum likelihood method, etc.) are preferred. The wave phase velocity $v$ may be calculated from the expression:

$$v = (2\pi f)/\text{Real Part }(k),$$

and the wave attenuation constant $\alpha$ may be calculated from the expression:

$$\alpha = \text{Imaginary Part }(k).$$

In applying Prony's method, the receiver response at a fixed frequency is first assumed to be $$P_g(z) = \sum_{m=1}^{P} A_m e^{ik_m z} \qquad (9)$$

A linear predictor is defined as h(z) so as to satisfy the relationship $$P(z) \circledZ h(z) = 0 \qquad (10)$$

where the notation, $\circledZ$, means convolution in z. If H(k) is the Fourier transform of h(z) in the wave-number domain, Equations (9) and (10) can be satisfied only when H(k) is zero at $k = k_m$.

In Prony's method, the spatial variables $P_g(z)$ and h(z) are first truncated to finite intervals of z. The linear equations of Equation (10) are then used to solve for h(z) (assuming h(0)=1. The function h(z) is transformed to H(k). Solving the k's for the equation H(k)=0, the estimates of $k_m$'s are obtained. The wave phase velocity and attenuation are then obtained from the $k_m$'s according to Equation (3b). The amplitude functions $A_m$'s can also be estimated by least square fitting. (This is different from the least square method described above. Here, the calculated values of $k_m$ are used in the fitting.) Further information on Prony's method may be found, for example, at S. L. MARPLE, JR., DIGITAL SPECTRAL ANALYSIS, Prentice Hall, 1987 (incorporated herein for all purposes by this reference), at pages 303-349.

In the conventional beamforming method, the function $\rho(k)$ is calculated from the expression:

$$\rho(k) = G^*(k) R\, G(k) \qquad (11)$$

where $R = [P][P]^*$ is the covariance matrix from the measured data, and $$G(k) = \begin{bmatrix} e^{ikz1} \\ \cdot \\ \cdot \\ \cdot \\ e^{ikzN} \end{bmatrix} ; [P] = \begin{bmatrix} P_1 \\ \cdot \\ \cdot \\ \cdot \\ P_N \end{bmatrix} \qquad (11)$$

The superscript * means complex conjugate and transpose of the matrix or vector. The values of the wavenumbers $k_m$ are obtained by searching the locations of the maxima of $\rho(k)$.

In the maximum likelihood method, the function L(k) is first calculated as $$L(k) = \frac{[G^*(k)(R^{-1})^* G(k)]}{abs\,[G^*(k)\,R^{-1}\,G(k)]^2} \qquad (12)$$

where G(k) and R are in the form described above. The values of $k_m$ are obtained by searching for the locations of the local maxima of L(k). Further information on the maximum likelihood method may be found in Capon, Greenfield and Kolker, Multidimensional Maximum Likelihood Processing of a Large Aperture Seismic Array, 55 PROCEEDINGS OF THE IEEE, 1967 (incorporated herein for all purposes by this reference), at pages 192-211.

Borehole compensation may be included in the tool or the processing algorithms. One way to achieve borehole compensation is to use two source transducers, one above and the other below the receivers. The two sources are fired sequentially so that one estimate is from the upward-going waves and the other is from the downward-going waves. These two estimates (from the upward- and downward-going waves) are averaged to obtain the borehole-compensated results. Another way to achieve borehole compensation is to use depth-derived borehole compensation with only one source transducer. This is done by a synthesized array from a sequence of tool locations by picking the appropriate receiver so that the receiver location of the synthesized array is stationary. By estimating the formation quantities from the synthesized array and from the original array data, and by averaging the two estimates at a proper depth location, a borehole-compensated result may be obtained.

A further application is to derive the shear velocity profile as a function of radius from the borehole axis in the zone near the borehole from the collection of the dispersion data at discrete frequencies. This can be done in the following way. First, the flexural wave velocity versus frequency is estimated from the multipole logging tool signals and the processing described herein. Second, a theoretical model of acoustic waves in a borehole with radial velocity profile is used to calculate the flexural wave profile (for example, as described below). Then, one searches for the velocity profile until the difference between the measured and calculated (from theory) flexural velocity versus frequency is minimized. The search can be done by curve-fitting methods such as a least square method or a generalized linear inversion method. The theory can be derived from A. KURKJIAN and S. CHANG, Acoustic Multipole Sources in Fluid-Filled Boreholes, 51 GEOPHYSICS Jan. 1, 1986 (incorporated herein for all purposes by this reference), at pages 148-163, or from Appendix A of L. BAKER and G. WINBOW, Multipole P-wave Logging in Formations Altered by Drilling, 53 GEOPHYSICS, September, 1988 (incorporated herein for all purposes by this reference), at pages 1207-1218. Explicitly, this procedure is expressed in two ways:

1. Find the shear velocity as a function of radius $v_s(r)$ such that:

$$\sum_{i=1,\ldots,N} w_i\, |v_{fl}\,(f_i) - v_{fl}*\,(f_i)|^2 \text{ is minimum,}$$

where $v_{fl}$ is the measured flexural wave velocity, $v_{fl}*$ is the theoretically calculated flexural wave velocity, and $w_i$ is a weighting function which can be chosen to be one or a function of wave amplitude at the i-th frequency.

2. Find the shear velocity as a function of radius $v_s(r)$ such that:

$$\max_{i=1,\ldots,N}\, |v_{fl}\,(f_i) - v_{fl}*\,(f_i)| \text{ is minimum.}$$

The approach to solving these problems need not be described here, since it is well known in general. See, for example, R. HAMMING, NUMERICAL METHODS FOR SCIENTISTS AND ENGINEERS, 2d Ed. (1973), at pages 68-70, and R. WIGGINS, *The General Linear Inverse Problem: Implications of Surface Wave and Free Oscillations for Earth Structure*, 10 REVIEWS OF GEOPHYSICS AND SPACE PHYSICS 1 (1972), at pages 251–285 (general linear inverse).

It is noted that while many of the spectral-analysis processing methods described above have in the past been employed in efforts to transform time-domain signals into frequency domain (e.g., in efforts to estimate frequency domain velocities from time-domain data), it believed that they have not heretofore been applied to the estimation of velocities from frequency-domain measurements acquired in accordance with the present invention.

Those of skill in the art will recognize that discrete-frequency, multipole-wave logging tools other than the dipole and quadrupole tools described herein can also be configured within the spirit and scope of the present invention.

The preferred embodiments described above are not intended to be limiting, but are instead intended as merely illustrative of the present invention. Those of skill in the art will recognize that many modifications may be made in the disclosed embodiments without departing from the spirit and scope of the present invention as defined by the following claims.

What is claimed is:

1. A method of borehole logging, comprising the steps of:
   (a) emitting sonic energy from a multipole source at a first location in a borehole, said sonic energy being of at least one discrete frequency which induces propagation of multipole sonic waves in the wall of said borehole;
   (b) receiving sonic energy of said multipole sonic waves at multiple receiver locations in said borehole to produce a received sonic signal for each location, said multiple receiver locations being spaced apart from one another and from said first location;
   (c) for each said receiver location, detecting the complex values of the received sonic signal; and
   (d) processing said detected complex values of the received sonic signals to determine phase velocity of said multipole sonic waves in said borehole as a function of frequency.

2. The method of claim 1, wherein step (a) comprises continuously emitting said sonic energy at said discrete frequency.

3. The method of claim 1, wherein step (a) comprises intermittently emitting said sonic energy at said discrete frequency.

4. The method of claim 1, wherein step (a) comprises simultaneously emitting said sonic energy at a plurality of discrete frequencies.

5. The method of claim 1, wherein step (a) comprises repetitively emitting said sonic energy at a plurality of discrete frequencies below 6 kHz.

6. The method of claim 1, further comprising the step of repeating steps (a)–(c) for each discrete frequency.

7. The method of claim 1, further comprising the step of deriving a predetermined phase reference from said emitted sonic energy, and wherein said step of detecting the complex values of the received sonic signal comprises the step of detecting said complex values of the received sonic signal in relation to said predetermined phase reference.

8. The method of claim 1, further comprising the step of processing said detected complex values of the received sonic signals to determine attenuation of said multipole sonic waves in said borehole.

9. The method of claim 8, further comprising the step of processing said detected complex values of the received sonic signals to determine attenuation of said multipole sonic waves in said borehole.

10. The method of claim 6, further comprising the step of processing said detected complex values of the received sonic signals to determine attenuation of said multipole sonic waves in said borehole as a function of frequency.

11. The method of claim 1, wherein step (d) comprises the step of calculating multipole sonic wave phase velocity $v$ and multipole sonic wave attenuation constant $\alpha$ from said detected complex values at two of said receiver locations and from the expressions:

$$v(f)^{-1} = [\text{phase}(P_g(z_1, f)) - \text{phase}(P_g(z_2, f))]/2\pi f(z_1 - z_2)$$

$$\alpha = \ln[abs(P_g(z_2, f)/P_g(z_1, f))]/(z_1 - z_2)$$

where the shear-wave detected-signal function is expressed as:

$$P_g(z, f) = A(f) e^{-\alpha z} e^{i2\pi(f/v)z}$$

and where $P_g$ is the detected-signal function; A is amplitude as a function of frequency and is independent of spacing between said emitting location and said receiver locations; z is the spacing between said emitting location and a receiver location; f is the discrete frequency at which the multipole sonic wave energy is propagated; and $z_1$ and $z_2$ are respective said receiver locations.

12. The method of claim 1, wherein step (d) comprises the step of calculating multipole sonic wave phase velocity $v$ and multipole sonic wave attenuation constant $\alpha$ from said detected complex values at three of said receiver locations spaced at intervals $\Delta z$ and from the expression:

$$k = 2\pi(f/v) + i\alpha = (\ln G)/(i\Delta z)$$

where $$G = \frac{(P_1 + P_3) \pm \sqrt{(P_1 + P_3)^2 - 4P_2^2}}{2P_2}$$

and where k is the complex wave-number of the received multipole sonic wave, f is the frequency of the received multipole sonic wave, and $P_n$ is the complex detected signal of the receiver located at an n-th one of said receiving locations.

13. The method of claim 12, further comprising the step of calculating a multipole sonic wave reflection coefficient from the ratio of B' and A' in which $$A' = \frac{P_2 - P_3 G}{1 - G^2}$$

$$B' = P_1 - A'.$$

14. The method of claim 1, further comprising the step of determining values for A and B and k such that the expression:

$$R = \sum_{n=1}^{n=N} (abs\ (P_n - Ae^{ikz_n} - Be^{-ikz_n}))^2$$

is minimized and where N is a plural number of said receiver locations, k is the complex wave-number of the received multipole sonic wave, $z_n$ is an n-th one of said receiving locations, and $P_n$ is the complex detected signal of the receiver located at $z_n$ and is expressed as:

$$P_n = A\ e^{ikz_n} + B\ e^{ikz_n}.$$

15. The method of claim 14, further comprising the step of calculating the multipole sonic wave reflection coefficient from the ratio of said determined values for A and B.

16. The method of claim 14, wherein step (d) comprises the step of calculating the multipole sonic wave phase velocity $v$ from the expression:

$$v = (2\pi f)/\text{Real Part }(k).$$

17. The method of claim 14, further comprising the step of calculating the multipole sonic wave attenuation constant $\alpha$ from the expression:

$$\alpha = \text{Imaginary Part }(k).$$

18. The method of claim 1, further comprising the steps of
   (a) defining the detected signal P(z) at a fixed frequency to be $$P(z) = \sum_{m=1}^{p} A_m e^{ik_m t};$$

(b) defining a linear predictor h(z) so as to satisfy the relationship $$P(z) \circledZ h(z) = 0$$

where the notation, $\circledZ$, means convolution in z;
   (c) defining H(k) as the Fourier transform of h(z) in the wave-number domain, where said definitions of receiver response P(z) and said linear predictor h(z) can be satisfied only when H(k) is zero at $k = k_m$;
   (d) truncating spatial variables P(z) and h(z) to finite intervals of z;
   (e) solving the linear equations of the relationship $$P(z)\ z\ h(z) = 0$$

for h(z), assuming h(0) = 1;
   (f) transforming the function h(z) to H(k); and
   (g) calculating values of k for the equation H(k) = 0 to obtain estimated values for $k_m$.

19. The method of claim 18, wherein step (d) comprises the step of calculating the multipole sonic wave phase velocity and multipole sonic wave attenuation from said values for $k_m$ from the relationship $$k = 2\pi(f/v) + i\alpha.$$

20. The method of claim 18, further comprising the step of estimating said amplitude functions $A_m$ by least square fitting.

21. The method of claim 1, further comprising the steps of
   (a) calculating the function L(k) as $$L(k) = \frac{[G^*(k)\ (R^{-1})^*\ G(k)]}{abs\ [G^*(k)\ R^{-1}\ G(k)]^2}$$

where $$G(k) = \begin{bmatrix} e^{ikz_1} \\ \cdot \\ \cdot \\ \cdot \\ e^{ikz_N} \end{bmatrix}; \text{and}$$

$$P = \begin{bmatrix} P_1 \\ \cdot \\ \cdot \\ \cdot \\ P_N \end{bmatrix}$$

and where $R = [P][P]^*$ is the covariance matrix from the measured data, $P_n$ is the complex receiver response of the receiver located at $z_n$, N is the number of receivers in the array, and the superscript * denotes conjugate transpose of the matrix or the vector; and
   (b) determining values of $k_m$ by searching for the locations of the local maxima of L(k).

22. The method of claim 1, further comprising the steps of
   (a) calculating the function $p(k) = G^*(k)\ R\ G(k)$, where $$G(k) = \begin{bmatrix} e^{ikz_1} \\ \cdot \\ \cdot \\ \cdot \\ e^{ikz_N} \end{bmatrix}; \text{and}$$

$$P = \begin{bmatrix} P_1 \\ \cdot \\ \cdot \\ \cdot \\ P_N \end{bmatrix}$$

and where $R = [P][P]^*$ is the covariance matrix from the measured data, $P_n$ is the complex receiver response of the receiver located at $z_n$, N is the number of receivers in the array, and the superscript * denotes conjugate transpose of the matrix or the vector; and
   (b) determining values of wavenumbers $k_m$ by searching for the locations of the maxima of L(k).

23. The method of claim 1, wherein step (d) comprises the step of deriving a radial shear velocity profile for a zone near said borehole.

24. The method of claim 23, wherein said step of deriving a radial shear velocity profile comprises:
   (a) estimating a flexural wave velocity versus frequency profile in a zone surrounding said borehole from said detected complex values;
   (b) calculating a theoretical multipole wave velocity versus frequency and the shear velocity profile for said zone; and (c) searching for a flexural wave velocity versus frequency profile for said zone by curve-fitting until the difference between said estimated profile and said calculated profile is minimized.

25. The method of claim 1, wherein step (d) comprises the step of determining shear velocity in a zone near said borehole by selecting the multipole sonic wave phase velocity at the lowest said discrete frequency for which a reasonable signal-to-noise ratio is obtained.

26. The method of claim 1, wherein step (d) comprises the step of deriving a shear velocity value for a zone near said borehole.

27. The method of claim 26, wherein said step of deriving a shear velocity value comprises:
  (a) estimating a multipole sonic wave velocity versus frequency profile in a zone surrounding said borehole from said detected complex values;
  (b) calculating a theoretical multipole sonic wave velocity versus frequency profile for said zone; and
  (c) searching for a shear wave value for said zone by curve-fitting until the difference between said estimated profile and said calculated profile is minimized.

28. The method of claim 27, wherein said step of searching for a shear wave value comprises the step of finding the shear velocity $v_{shear}$ such that:

$$\sum_{i=1,\ldots,N} w_i |v_{fl}(f_i) - v_{fl}^*(f_i)|^2 \text{ is minimum,}$$

where $v_{fl}$ is the measured flexural- or screw-wave or other higher-order multipole wave velocity, $v_{fl}^*$ is the theoretically-calculated flexural- or screw-wave or other higher-order multipole wave velocity, and $w_i$ is a weighting function which can be chosen to be one or a function of wave amplitude at the i-th frequency.

29. The method of claim 27, wherein said step of searching for a shear wave value comprises the step of finding the shear velocity $v_{shear}$ such that:

$$\max_{i=1,\ldots,N} |v_{fl}(f_i) - v_{fl}^*(f_i)| \text{ is minimum,}$$

where $v_{fl}$ is the measured flexural- or screw-wave or other higher-order multipole wave velocity, $v_{fl}^*$ is the theoretically-calculated flexural- or screw-wave or other higher-order multipole wave velocity, and $w_i$ is a weighting function which can be chosen to be one or a function of wave amplitude at the i-th frequency.

30. Apparatus for borehole logging, comprising:
  (a) multipole source means for emitting sonic energy at a first location in a borehole, said sonic energy being of at least one discrete frequency which induces propagation of multipole sonic waves in the wall of said borehole;
  (b) multipole detector means for receiving sonic energy of said multipole sonic waves at multiple receiver locations in said borehole to produce a received sonic signal for each location, said multiple receiver locations being spaced apart from one another and from said first location;
  (c) means for detecting, for each said receiver location, the complex values of the received sonic signal; and
  (d) means for processing said detected complex values of the received sonic signals to determine phase velocity of said multipole sonic waves in said borehole as a function of frequency.

31. The apparatus of claim 30, wherein said emitting means comprises a multipole source transducer and means for driving said multipole source transducer to continuously emit sonic energy at said discrete frequency.

32. The apparatus of claim 30, wherein said emitting means comprises a multipole source transducer and means for driving said multipole source transducer to intermittently emit sonic energy at said discrete frequency.

33. The apparatus of claim 30, wherein said emitting means comprises a multipole source transducer and means for driving said multipole source transducer to simultaneously emit sonic energy at a plurality of discrete frequencies.

34. The apparatus of claim 30, wherein said emitting means comprises a multipole source transduder and means for driving said multipole source transducer with a repetitive signal such that said source transducer emits sonic energy at a plurality of discrete frequencies below 6 KHz.

35. The apparatus of claim 30, wherein said emitting means comprises a multipole source transducer and means for driving said multipole source transducer to emit sonic energy in sequential bursts at a variety of discrete frequencies, and wherein, for each said burst, said multipole detector means detects for each said receiver location amplitude of the received sonic energy of said multipole sonic waves and phase of the received sonic energy of said multipole sonic waves relative to a phase reference.

36. The apparatus of claim 30, wherein said multipole detector means detects for each said receiver location amplitude of the received sonic signal of said multipole sonic waves and phase of the received sonic signal of said multipole sonic waves relative to a phase reference derived from said emitted sonic energy.

37. The apparatus of claim 30, further comprising means for processing said detected complex values of the received sonic signals to determine attenuation of said multipole sonic waves in said borehole.

38. The apparatus of claim 30, further comprising means for processing said detected complex values of the received sonic signals to determine attenuation of said multipole sonic waves in said borehole as a function of frequency.

39. The apparatus of claim 30, wherein said processing means comprises means for deriving a radial shear velocity profile for a zone near said borehole.

40. The apparatus of claim 30, wherein said processing means comprises means for deriving a value of shear velocity for a zone near said borehole.

41. A method of borehole logging, comprising the steps of:
  (a) emitting sonic energy from a multipole source at a first location in a borehole, said sonic energy being of at least one discrete frequency which induces propagation of multipole sonic waves in the wall of said borehole;
  (b) receiving sonic energy of said multipole sonic waves at multiple receiver locations in said borehole to produce a received sonic signal for each location, said multiple receiver locations being spaced apart from one another and from said first location;

(c) for each said receiver location, detecting the complex values of the received sonic signal; and
(d) processing said detected complex values of the received sonic signals to determine attenuation of said multipole sonic waves in said borehole as a function of frequency.

42. The method of claim 41, wherein step (a) comprises continuously emitting said sonic energy at said discrete frequency.

43. The method of claim 41, wherein step (a) comprises intermittently emitting said sonic energy at said discrete frequency.

44. The method of claim 41, wherein step (a) comprises simultaneously emitting said sonic energy at a plurality of discrete frequencies.

45. The method of claim 41, wherein step (a) comprises repetitively emitting said sonic energy at a plurality of discrete frequencies below 6 kHz.

46. The method of claim 41, further comprising the step of repeating steps (a)–(c) for each discrete frequency.

47. The method of claim 41, wherein step (d) further comprises the step of processing said detected complex values of the received sonic signals to determine phase velocity of said multipole sonic waves in said borehole.

48. The method of claim 41, further comprising the step of deriving a predetermined phase reference from said emitted sonic energy, and wherein said step of detecting the complex values of the received sonic signal comprises the step of detecting said complex values of the received sonic signal in relation to said predetermined phase reference.

49. The method of claim 48, further comprising the step of processing said detected complex values of the received sonic signals to determine phase velocity of said multipole sonic waves in said borehole.

50. The method of claim 41, wherein step (d) comprises the step of calculating multipole sonic wave phase velocity $v$ and mulitpole sonic wave attenuation constant $\alpha$ from said detected complex values at two of said receiver locations and from the expressions:

$$v(f)^{-1} = [\text{phase}(P_g(z_1, f)) - \text{phase}(P_g(z_2, f))]/2\pi f(z_1 - z_2)$$

$$\alpha = \ln[abs(P_g(z_2, f)/P_g(z_1, f))]/(z_1 - z_2)$$

where the shear-wave detected-signal function is expressed as:

$$P_g(z, f) = A(f) e^{-\alpha z} e^{12\pi(f/v)z}$$

and where $P_g$ is the detected-signal function; A is amplitude as a function of frequency and is independent of spacing between said emitting location and said receiver locations; z is the spacing between said emitting location and a receiver location; f is the discrete frequency at which the multipole sonic wave energy is propagated; and $z_1$ and $z_2$ are respective said receiver locations.

51. The method of claim 41, wherein step (d) comprises the step of calculating multipole sonic wave phase velocity $v$ and multipole sonic wave attenuation constant $\alpha$ from said detected complex values at three of said receiver locations spaced at intervals $\Delta z$ and from the expression:

$$k = 2\pi(f/v) + i\alpha = (\ln G)/(i\Delta z)$$

where $$G = \frac{(P_1 + P_3) \pm \sqrt{(P_1 + P_3)^2 - 4P_2^2}}{2P_2}$$

and where k is the complex wave-number of the received multipole sonic wave, f is the frequency of the received multipole sonic wave, and $P_n$ is the complex detected signal of the receiver located at an n-th one of said receiving locations.

52. The method of claim 51, further comprising the step of calculating a multipole sonic wave reflection coefficient from the ratio of B' and A' in which $$A' = \frac{P_2 - P_3 G}{1 - G^2}$$

$$B' = P_1 - A'.$$

53. The method of claim 41, wherein step (d) comprises the step of determining values for A and B and k such that the expression:

$$R = \sum_{n=1}^{n=N} (abs(P_n - Ae^{ikz_n} - Be^{ikz_n}))^2$$

is minimized and where N is a plural number of said receiver locations, k is the complex wave-number of the received multipole sonic wave, $z_n$ is an n-th one of said receiving locations, and $P_n$ is the complex detected signal of the receiver located at $z_n$ and is expressed as:

$$P_{is} = A e^{ikz_{is}} + B e^{-ikz_{is}}$$

54. The method of claim 53, further comprising the step of calculating the multipole sonic wave reflection coefficient from the ratio of said determined values for A and B.

55. The method of claim 53, further comprising the step of calculating the multipole sonic wave phase velocity $v$ from the expression:

$$v = (2\pi f)/\text{Real Part}(k)$$

56. The method of claim 53, further comprising the step of calculating the multipole sonic wave attenuation constant $\alpha$ from the expression:

$$\alpha = \text{Imaginary Part}(k)$$

57. The method of claim 41, wherein step (d) comprises the steps of
(a) defining the detected signal P(z) at a fixed frequency to be $$P(z) = \sum_{m=1}^{p} A_m e^{ikm2};$$

(b) defining a linear predictor h(z) so as to satisfy the relationship $$P(z) \circledZ h(z) = 0$$

where the notation, $\circledZ$, means convolution in z;
(c) defining H(k) as the Fourier transform of h(z) in the wave-number domain, where said definitions of receiver response P(z) and said linear predictor h(z) can be satisfied only when H(k) is zero at $k = k_m$;

(d) truncating spatial variables P(z) and h(z) to finite intervals of z;

(e) solving the linear equations of the relationship $$P(z)h(z) = 0$$

for h(z), assuming $h(0) = 1$;

(f) transforming the function h(z) to H(k); and (g) calculating values of k for the equation $H(k) = 0$ to obtain estimated values for $k_m$.

58. The method of claim 57, further comprising the step of calculating the multipole sonic wave phase velocity and multipole sonic wave attenuation from said values for $k_m$ from the relationship $$k = 2\pi(f/v) + i\alpha$$

59. The method of claim 57, further comprising the step of estimating said amplitude functions $A_m$ by least square fitting.

60. The method of claim 41, wherein step (d) comprises the steps of (a) calculating the function L(k) as $$L(k) = \frac{[G^*(k) (R^{-1})^* G(k)]}{abs [G^*(k) R^{-1} G(k)]^2}$$

where $$G(k) = \begin{bmatrix} e^{ikz1} \\ \cdot \\ \cdot \\ \cdot \\ e^{ikzN} \end{bmatrix} ; \text{ and}$$

$$P = \begin{bmatrix} P_1 \\ \cdot \\ \cdot \\ \cdot \\ P_N \end{bmatrix}$$

and where $R = [P][P]^*$ is the covariance matrix from the measured data, $P_n$ is the complex receiver response of the receiver located at $z_n$, N is the number of receivers in the array, and the superscript * denotes conjugate transpose of the matrix or the vector; and (b) determining values of $k_m$ by searching for the locations of the local maxima of L(k).

61. The method of claim 41, wherein step (d) comprises the steps of (a) calculating the function $p(k) = G^*(k)R \ G(k)$, where $$G(k) = \begin{bmatrix} e^{ikz1} \\ \cdot \\ \cdot \\ \cdot \\ e^{ikzN} \end{bmatrix} ; \text{ and}$$

$$P = \begin{bmatrix} P_1 \\ \cdot \\ \cdot \\ \cdot \\ P_N \end{bmatrix}$$

and where $R = [P][P]^*$ is the covariance matrix from the measured data, $P_n$ is the complex receiver response of the receiver located at $z_n$, N is the number of receivers in the array, and the superscript * denotes conjugate transpose of the matrix or the vector; and (b) determining values of wavenumbers $k_m$ by searching for the locations of the maxima of L(k).

62. The method of claim 41, further comprising the step of deriving a radial shear velocity profile for a zone near said borehole.

63. The method of claim 62, wherein said step of deriving a radial shear velocity profile comprises:

(a) estimating a flexural wave velocity versus frequency profile in a zone surrounding said borehole from said detected complex values;

(b) calculating a theoretical multipole wave velocity versus frequency and the shear velocity profile for said zone; and (c) searching for a flexural wave velocity versus frequency profile for said zone by curve-fitting until the difference between said estimated profile and said calculated profile is minimized.

64. The method of claim 41, further comprising the step of determining shear velocity in a zone near said borehole by selecting the multipole sonic wave phase velocity at the lowest said discrete frequency for which a reasonable signal-to-noise ratio is obtained.

65. The method of claim 41, further comprising the step of deriving a shear velocity value for a zone near said borehole.

66. The method of claim 65, wherein said step of deriving a shear velocity value comprises:

(a) estimating a multipole sonic wave velocity versus frequency profile in a zone surrounding said borehole from said detected complex values;

(b) calculating a theoretical multipole sonic wave velocity versus frequency profile for said zone; and (c) searching for a shear wave value for said zone by curve-fitting until the difference between said estimated profile and said calculated profile is minimized.

67. The method of claim 66, wherein said step of searching for a shear wave value comprises the step of finding the shear velocity $v_{shear}$ such that:

$$\sum_{i=1,\ldots,N} W_i |v_{fl}(f_i) - v_{fl}^*(f_i)|^2 \text{ is minimum,}$$

where $v_{fl}$ is the measured flexural- or screw-wave or other higher-order multipole wave velocity, $v_{fl}^*$ is the theoretically-calculated flexural- or screw-wave or other higher-order multipole wave velocity, and $w_i$ is a weighting function which can be chosen to be one or a function of wave amplitude at the i-th frequency.

68. The method of claim 66, wherein said step of searching for a shear wave value comprises the step of finding the shear velocity $v_{shear}$ such that:

$$\max_{i=1,\ldots,N} |v_{fi}(f) - v_{fi}^*(f)| \text{ is minimum,}$$

where $v_{fi}$ is the measured flexural- or screw-wave or other higher-order multipole wave velocity, $v_{fi}^*$ is the theoretically-calculated flexural- or screw-wave or other higher-order multipole wave velocity, and $w_i$ is a weighting function which can be chosen to be one or a function of wave amplitude at the i-th frequency.

69. Apparatus for borehole logging, comprising:
   (a) multipole source means for emitting sonic energy at a first location in a borehole, said sonic energy being of at least one discrete frequency which induces propagation of multipole sonic waves in the wall of said borehole;
   (b) multipole detector means for receiving sonic energy of said multipole sonic waves at multiple receiver locations in said borehole to produce a received sonic signal for each location, said multiple receiver locations being spaced apart from one another and from said first location;
   (c) means for detecting, for each said receiver location, the complex values of the received sonic signal; and
   (d) means for processing said detected complex values of the received sonic signals to determine attenuation of said multipole sonic waves in said borehole as a function of frequency.

70. The apparatus of claim 69, wherein said emitting means comprises a multipole source transducer and means for driving said multipole source transducer to continuously emit sonic energy at said discrete frequency.

71. The apparatus of claim 69, wherein said emitting means comprises a multipole source transducer and means for driving said multipole source transducer to intermittently emit sonic energy at said discrete frequency.

72. The apparatus of claim 69, wherein said emitting means comprises a multipole source transducer and means for driving said multipole source transducer to simultaneously emit sonic energy at a plurality of discrete frequencies.

73. The apparatus of claim 69, wherein said emitting means comprises a multipole source transducer and means for driving said multipole source transducer with a repetitive signal such that said source transducer emits sonic energy at a plurality of discrete frequencies below 6 KHz.

74. The apparatus of claim 69, wherein said emitting means comprises a multipole source transducer and means for driving said multipole source transducer to emit sonic energy at in sequential bursts at a variety of discrete frequencies, and wherein, for each said burst, said multipole detector means detects for each said receiver location amplitude of the received sonic energy of said multipole sonic waves and phase of the received sonic energy of said multipole sonic waves relative to a phase reference.

75. The apparatus of claim 69, wherein said multipole detector means detects for each said receiver location amplitude of the received sonic signal of said multipole sonic waves and phase of the received sonic signal of said multipole sonic waves relative to a phase reference derived from said emitted sonic energy.

76. The apparatus of claim 69, further comprising means for processing said detected complex values of the received sonic signals to determine propagation velocity of said multipole sonic waves in said borehole.

77. The apparatus of claim 69, further comprising means for processing said detected complex values of the received sonic signals to determine propagation velocity of said multipole sonic waves in said borehole as a function of frequency.

78. The apparatus of claim 77, further comprising means for deriving a radial shear velocity profile for a zone near said borehole.

79. The apparatus of claim 77, further comprising means for deriving a value of shear velocity for a zone near said borehole.

80. A method of borehole logging, comprising the steps of:
   (a) emitting sonic energy from a multipole source at a first location in a borehole, said sonic energy being of at least one discrete frequency which induces propagation of multipole sonic waves in the wall of said borehole;
   (b) receiving sonic energy of said multipole sonic waves at multiple receiver locations in said borehole to produce a received sonic signal for each location, said multiple receiver locations being spaced apart from one another and from said first location;
   (c) for each said receiver location, detecting the complex values of the received sonic signal; and
   (d) calculating multipole sonic wave phase velocity $v$ and multipole sonic wave attenuation constant $\alpha$ from said detected complex values at two of said receiver locations and from the expressions:

$$v(f)^{-1} = [\text{phase}(P_g(z_1, f)) - \text{phase}(P_g(z_2, f))]/2\pi f(z_1 - z_2)$$

$$\alpha = \ln[\text{abs}(P_g(z_2, f)/P_g(z_1, f))]/(z_1 - z_2)$$

where the shear-wave detected-signal function is expressed as:

$$P_g(z, f) = A(f)e^{-\alpha z}e^{j2\pi(f/v)z}$$

and where $P_g$ is the detected-signal function; A is amplitude as a function of frequency and is independent of spacing between said emitting location and said receiver locations; z is the spacing between said emitting location and a receiver location; f is the discrete frequency at which the multipole sonic wave energy is propagated; and $z_1$ and $z_2$ are respective said receiver locations.

81. The method of claim 80, wherein step (a) comprises continuously emitting said sonic energy at said discrete frequency.

82. The method of claim 80, wherein step (a) comprises intermittently emitting said sonic energy at said discrete frequency.

83. The method of claim 80, wherein step (a) comprises simultaneously emitting said sonic energy at a plurality of discrete frequencies.

84. The method of claim 80, wherein step (a) comprises repetitively emitting said sonic energy at a plurality of discrete frequencies below 6 kHz.

85. The method of claim 80, further comprising the step of repeating steps (a)–(c) for each discrete frequency.

86. The method of claim 80, further comprising the step of deriving a predetermined phase reference from said emitted sonic energy, and wherein said step of detecting the complex values of the received sonic signal comprises the step of detecting said complex values of the received sonic signal in relation to said predetermined phase reference.

87. A method of borehole logging, comprising the steps of:
(a) emitting sonic energy from a multipole source at a first location in a borehole, said sonic energy being of at least one discrete frequency which induces propagation of multipole sonic waves in the wall of said borehole;
(b) receiving sonic energy of said multipole sonic waves at multiple receiver locations in said borehole to produce a received sonic signal for each location, said multiple receiver locations being spaced apart from one another and from said first location;
(c) for each said receiver location, detecting the complex values of the received sonic signal; and
(d) calculating multipole sonic wave phase velocity $v$ and multipole sonic wave attenuation constant $\alpha$ from said detected complex values at three of said receiver locations spaced at intervals $\Delta z$ and from the expression:

$$k = 2\pi(f/v) + i\alpha = (\ln G)/(i\Delta z)$$

where $$G = \frac{(P_1 + P_3) \pm \sqrt{(P_1 + P_3)^2 - 4P_2^2}}{2P_2}$$

and where k is the complex wave-number of the received multipole sonic wave, f is the frequency of the received multipole sonic wave, and $P_n$ is the complex detected signal of the receiver located at an n-th one of said receiving locations.

* * * * *